Nov. 16, 1948.    J. T. RAUEN    2,453,728
CARBURETOR

Filed Oct. 7, 1940    7 Sheets-Sheet 1

INVENTOR.
JOHN T. RAUEN
BY
Edwin J. Balluff
ATTORNEY.

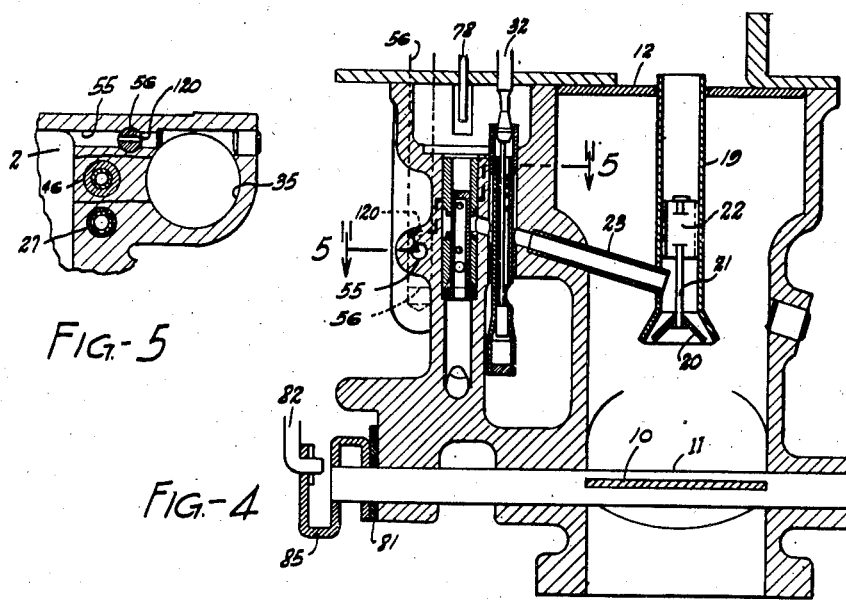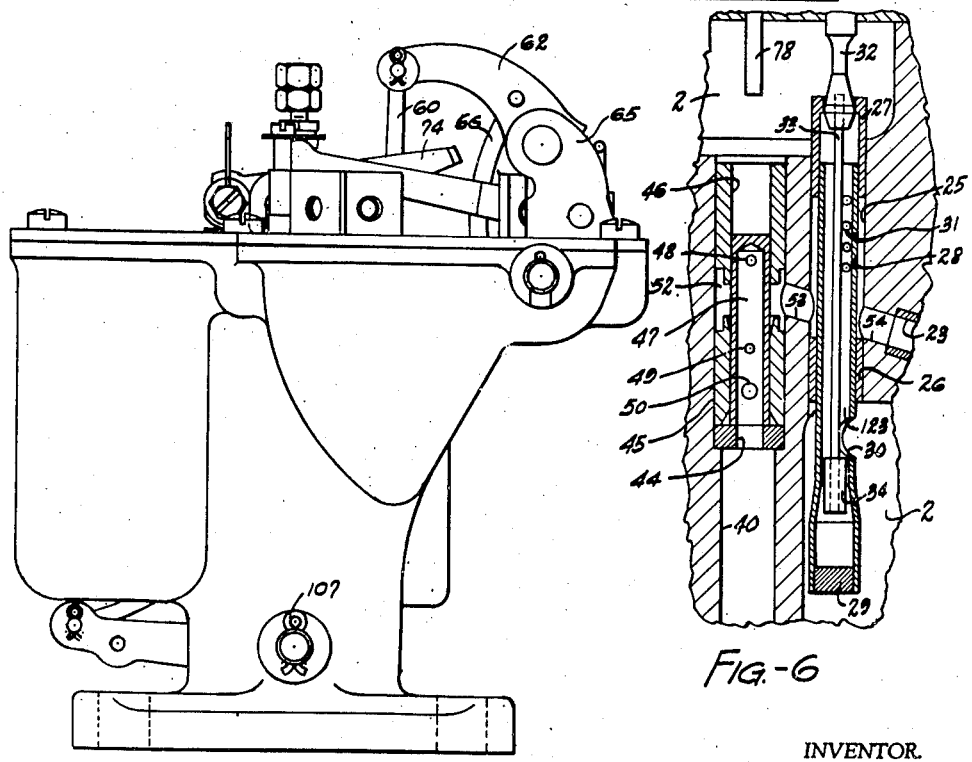

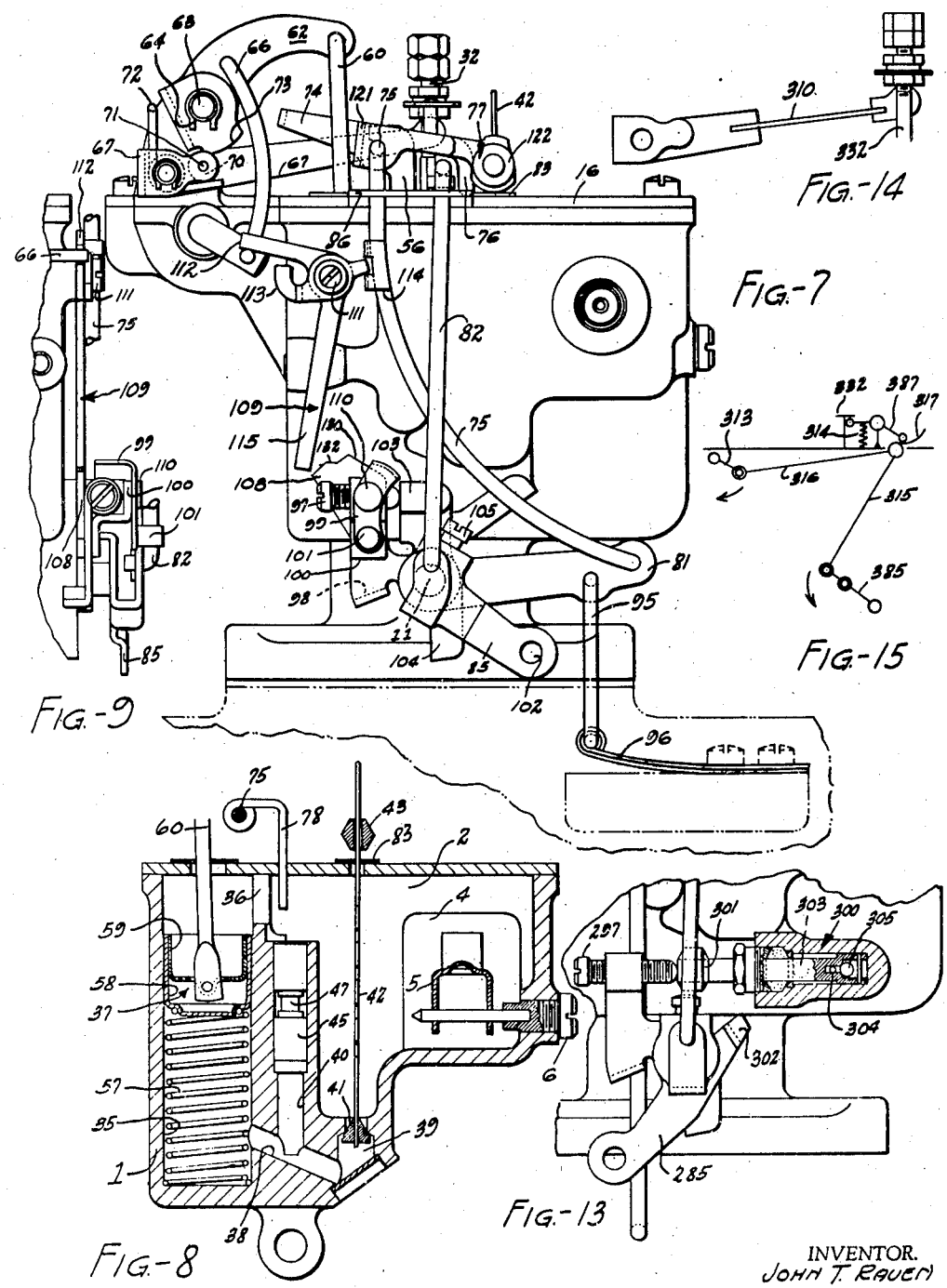

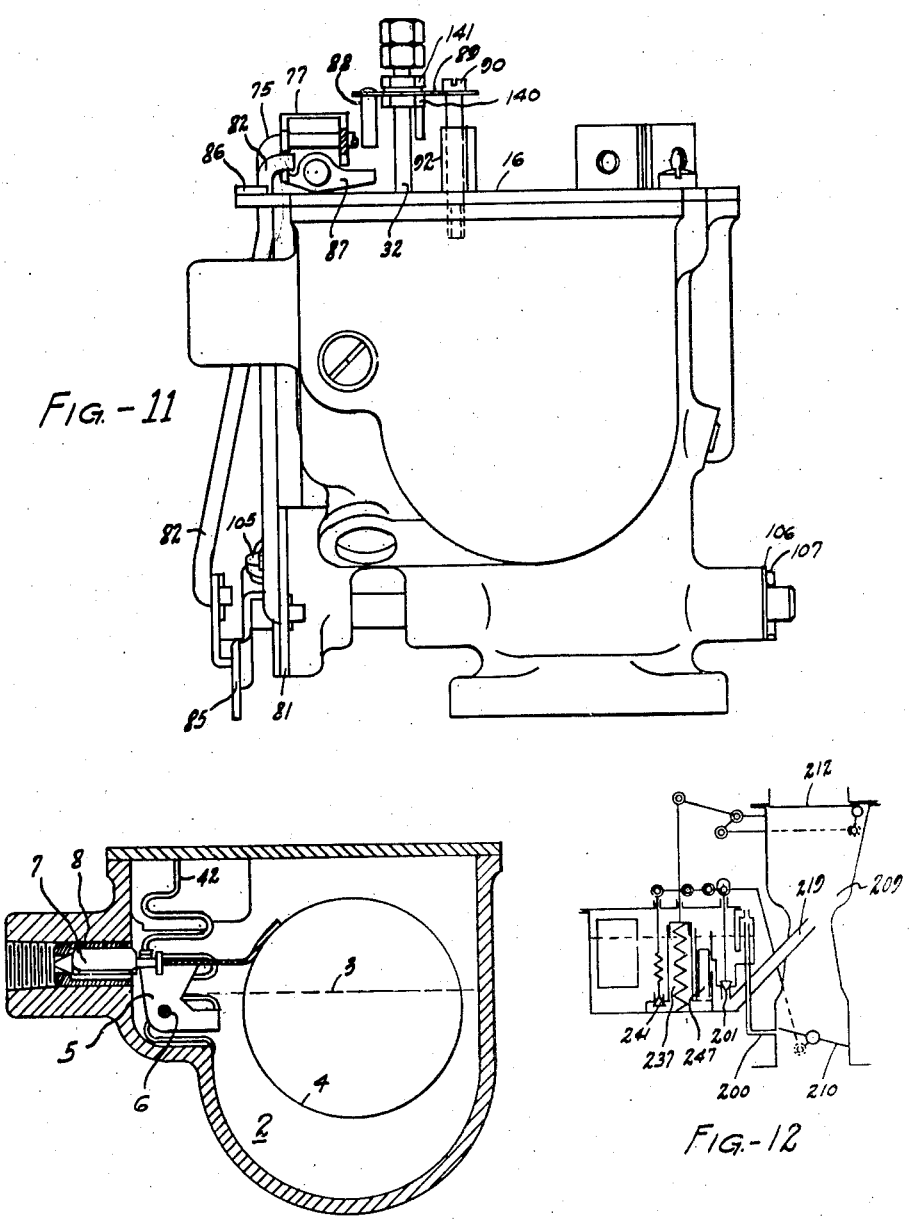

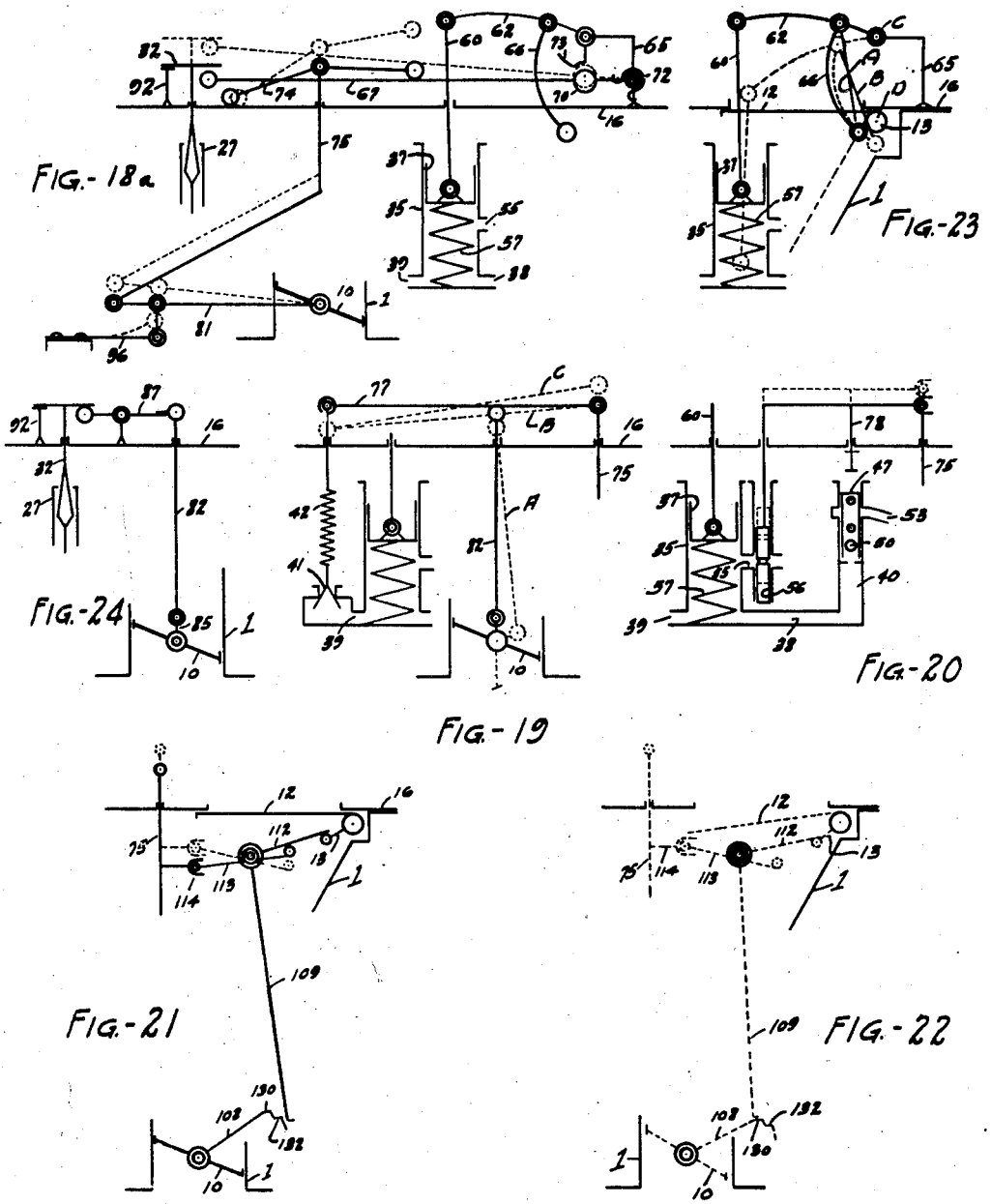

Nov. 16, 1948.  J. T. RAUEN  2,453,728
CARBURETOR
Filed Oct. 7, 1940  7 Sheets-Sheet 7
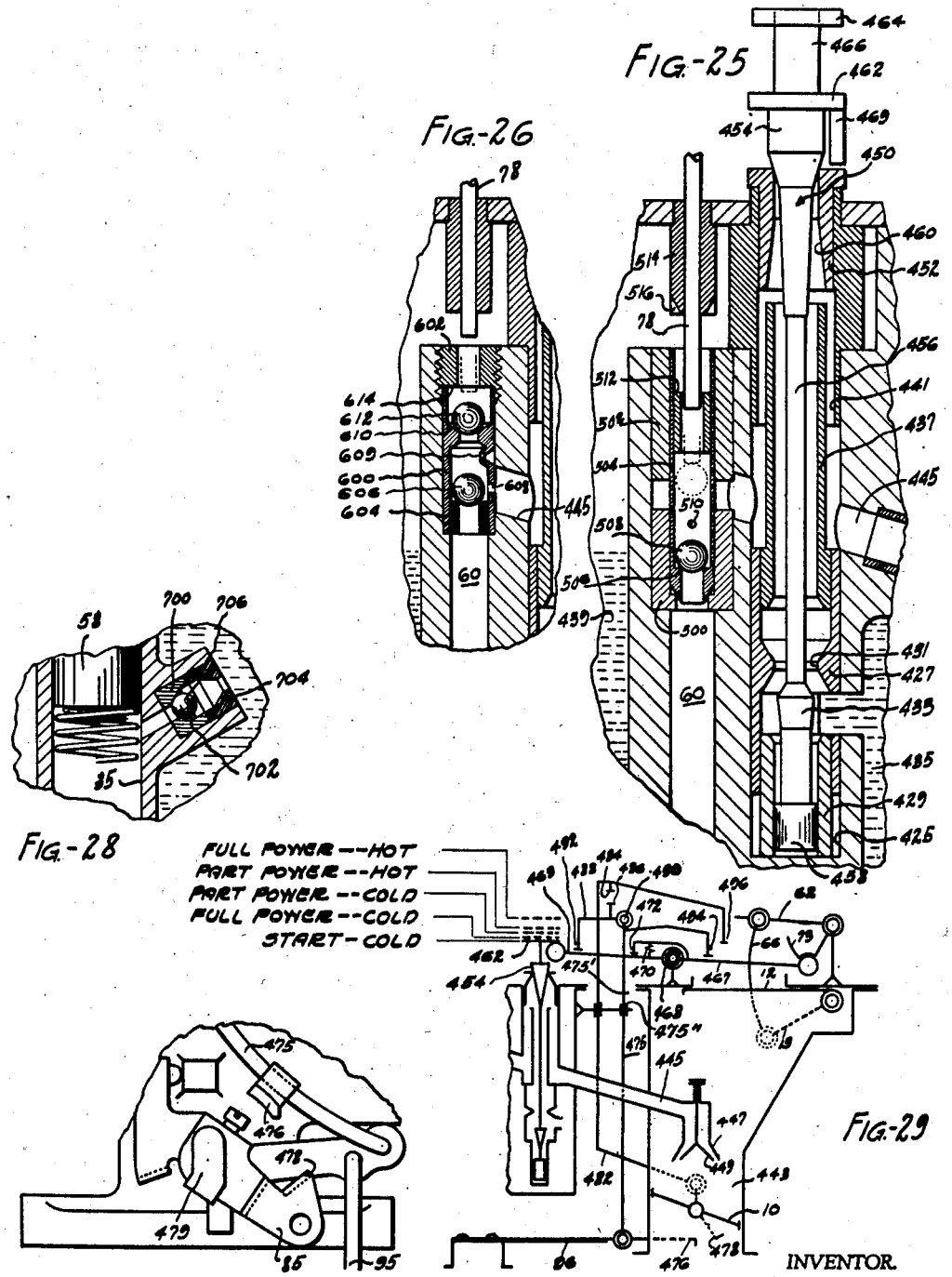

Patented Nov. 16, 1948

2,453,728

UNITED STATES PATENT OFFICE 2,453,728

CARBURETOR

John T. Rauen, Grosse Pointe, Mich.

Application October 7, 1940, Serial No. 360,046

67 Claims. (Cl. 123—119)

This invention relates to carburetors for internal combustion engines of automotive vehicles and is particularly adapted for those vehicles equipped with free wheeling driving mechanisms or with certain types of transmissions which require closing of the throttle during speed changes.

This invention, therefore, has for its principal objects to provide in a device of this character: means to prevent engine stalling when the vehicle is operating through the free wheeling mechanism and during idling when the engine is cold, without the continuous use of abnormal mixture, and, during idling immediately after use of full open throttle when the engine is hot; means for effecting immediate automatic recovery to prevent engine stalling from the effect of back-firing such as intake manifold explosions; means causing explosions in the induction system for the purpose of heating the induction system whereby stable carburetion conditions are quickly obtained while operating a cold engine; means for automatically enrichening the mixture to facilitate the starting and operation of a cold engine; draft-affected means for automatically reducing the fuel proportion of the starting mixture to a normal mixture upon firing of a cold engine; means for automatically increasing the amount of fuel delivered to the engine in excess of the normal full power mixture during acceleration, to the end of increasing the accelerating power of the engine; means for preventing back-fire flame from extending externally of the carburetor; means to prevent spilling of fuel externally of the carburetor as a result of back-fire; means for preventing spilling of fuel through the nozzle as a result of heat transmitted to the carburetor, from the engine after the same is stopped; means for automatically varying the amount of fuel delivered to the engine by the accelerating pump in excess of the regular normal supply during all degrees of throttle opening; means operated by the throttle for controlling the amount of fuel discharged by the accelerating pump; means for normally short-circuiting to the float chamber a portion of the fuel delivered by the accelerating pump; means whereby a draft affected valve, actuating a pump supplying fuel to the engine in excess of the normal supply, is allowed freedom of opening and closing action, to a degree of being substantially unrestricted in its movement to respond immediately as affected by variations in velocity of said draft; means operated by the throttle for varying the time of recharging a pump operated by a draft actuated valve; means whereby fuel is metered to the spray nozzle during each discharge stroke of the accelerating pump, said metering ceasing immediately when said discharge stroke ceases and also during the recharging stroke of said pump; means for automatically varying the amount of fuel delivered to the engine, during the movement of a draft affected valve; means for automatically varying the fuel pressure at the orifices passing fuel from the accelerating pump to the nozzle; means operated by the means for regulating the carburetor for starting a cold engine, whereby fuel discharged by an accelerating pump actuated by a draft affected valve is delivered to the engine in quantities in excess of that delivered to the engine when the same is hot; means to temporarily retain the mixture for starting a cold engine, after starting of the engine; means for gradually reducing the starting mixture of a cold engine to a cold operating mixture; means for keeping a cold engine operating on a mixture of a hot engine; means for metering air into a fuel metering means to regulate the fuel flow therefrom; means whereby the means metering air into a fuel metering means regulates the fuel metering means to provide fuel in quantities for starting a cold engine; means hydraulically controlled for reducing the mixture of starting a cold engine to a mixture for operating a cold engine; means whereby, and of, a draft affected valve, a fuel pump, a fuel metering means, a thermostatic or manual means, a throttle regulating means, and a throttle means cooperating to regulate a carburetor whereby a cold engine can be started and sustained immediately in continuous operation thereafter by the cooperation of said specified means; means controlled by cooperation of a draft affected valve and a thermostatic or manual means whereby a throttle valve is actuated in such a manner that a cold engine is maintained operating at an idle speed substantially equal to or less than its idle speed when up to normal or hot temperature, after the throttle valve has been opened in excess of the starting position; means whereby a carburetor having thermostatic or manual means regulating it for starting a cold engine provides a fuel mixture with which a cold engine will start, and thereafter automatically immediately regulate the mixture to sustain satisfactory engine operation from cold up to and including continuous normal hot operation independently of said thermostatic or manual regulating means; means whereby a valve of a carburetor adapted to resist the force of air entering the carburetor through the valve resists said air entry force, from closed to full open position with decreasing force, the source of said decreasing force being of either constant amount or increasing amount while said valve is moved by said air force; means whereby a spring actuating a valve of a carburetor, yieldingly against the force of a draft entering a carburetor actuates the valve to greater resisting force when the valve is at its closed position than when it is at its full open position; means whereby all of the fuel utilized by an engine is supplied by a carburetor having a single nozzle; means of a carburetor having a fuel pump and a draft-affected valve associated therewith for varying the normal fuel supply to the engine; means whereby a variable quantity of fuel discharged by a fuel pump associated with a carburetor having a draft-affected valve actuating said pump is delivered to the engine in proportion to the rate of operation of said pump; means whereby a valve automatically regulating the amount of fuel delivered to the engine from the discharge of a carburetor fuel pump regulates a greater portion of discharge fuel to the engine when the engine is cold than when hot; means for automatically regulating the amount of fuel delivered to an engine from the discharge of the accelerating pump; means providing for expansion of the normal volume of the discharge passage of a carburetor fuel pump before the discharge of fuel is made to the engine; means of a pump discharge valve whereby a portion of the quantity of fuel discharged therefrom can be by-passed from going into the engine; means whereby a pump discharge valve permitting fuel by-pass, passes fuel to the engine before by-passing fuel; means whereby a carburetor discharge valve regulating fuel from the pump to the engine prevents fuel discharge to the engine; means for regulating fuel discharged to the engine by a carburetor device including a pump means adapted to supply fuel to the normal supply discharged to the engine, and a draft-affected valve adapted to actuate said pump means whereby the mixture of fuel and air produced by said carbureting device is controlled within the limits of fuel and air mixture upon which an engine can be operated.

Another object of the invention is to provide a carbureting device with means for automatically varying the mixture proportions during engine operation to suit requirements of an engine to produce maximum power at any operable speed; means for automatically priming an operating cold engine; means whereby a carburetor automatically enrichens the mixture proportions operating an engine during slow speed operation; means whereby an engine automatically overcomes its tendency to stall from mixture starvation, by its manipulation of a carbureting device; means cooperating with actuation of the throttle of a carbureting device whereby the rate of recharging a fuel pump adapted to discharge fuel to the engine is varied by manipulation of said throttle; means cooperating with throttle to regulate the rate of recharging a pump, said means also being capable of regulating the recharging rate independently of the throttle; means whereby a pump actuated by a draft-affected valve automatically varies the force it imposes upon actuation of said draft valve, whereby the force imposed upon said draft valve is varied to permit the valve to fulfill its functions; means whereby a pump actuated by a draft-affected valve regulates the rate of return movement of said valve varying; means whereby the rate of pump recharging is rendered faster when the engine is cold than when the engine is hot; means whereby a carbureting device operates to supply a uniform mixture by assistance of a draft valve at one end of the range and without said assistance at the other end; means whereby a carbureting device adapted to automatically provide a starting mixture automatically stops providing said starting mixture by manipulation of the throttle valve; means preventing nozzle suction during reverse flow of gas through the carbureting device; means adapted to provide a secondary air entry, said means extending into and beyond said main entry whereby a portion of the main air stream in said device is concentrated to flow past a single nozzle; means of a carbureting device including a means adapted to provide a secondary air entry and automatic means for closing said secondary air entry preventing gas flow therethrough; means of a carbureting device having one or more air entries, and automatic means of closing said entries to prevent reversal of gas flow; an automatic means to permit gas flow from said device only when internal pressure exceeds a predetermined pressure; means of a carbureting device including a throttle valve, controls for said valve, and means cooperating with said controls delaying closing of the throttle when the throttle is permitted to close at a speed in excess of a predetermined rate; means affected by its inertia and cooperating with a throttle valve of a carbureting device whereby the throttle is delayed in closing when permitted to close at a speed in excess of a predetermined rate.

For a better understanding of the invention, reference may be had to the following specification, taken in conjunction with the accompanying drawings of which there are seven sheets and in which:

Fig. 3 is a side elevational view of the carburetor;

Fig. 4 is a vertical section taken in a plane on the line 4—4 of Fig. 1;

Fig. 5 is a sectional view taken along the staggered line 5—5 of Fig. 4, looking in the direction of the arrows;

Fig. 6 is an enlarged sectional view of the metering and pumping discharge valves illustrated in Fig. 4;

Fig. 7 is an elevational view of the carburetor of the side opposite that illustrated in Fig. 3;

Fig. 8 is a vertical sectional view taken along the staggered line 8—8 of Fig. 1;

Fig. 9 is an end elevational view of a portion of the linkage mechanism, looking from the left of Fig. 7;

Fig. 10 is a section taken along the line 10—10 of Fig. 1;

Fig. 11 is an end elevational view of the carburetor, looking from the right of Fig. 7;

Fig. 12 is a diagrammatic view of a carburetor illustrating a modified form of the application of the invention to a plain tube type of carburetor;

Fig. 13 is an elevational view, partially in section, of a portion of a carburetor illustrating a modified form of mechanism for delaying the closing of the throttle;

Fig. 14 is a modification of one of the details illustrated in Fig. 7;

Fig. 15 is a diagrammatic illustration of a modified form of means for providing a power mixture;

Fig. 17 is a diagrammatic illustration of the inertia type of throttle stopping mechanism illustrating the position of the mechanism when the throttle is at idling position and the engine hot;

Fig. 18 illustrates the same mechanism as shown in Fig. 17, holding the throttle open, slightly in excess of the idling position and the engine hot; this mechanism operates only when the engine is hot; the mechanism shown in Figs. 21 and 22 operates in its place when the engine is cold and during warming up;

Figure 16:
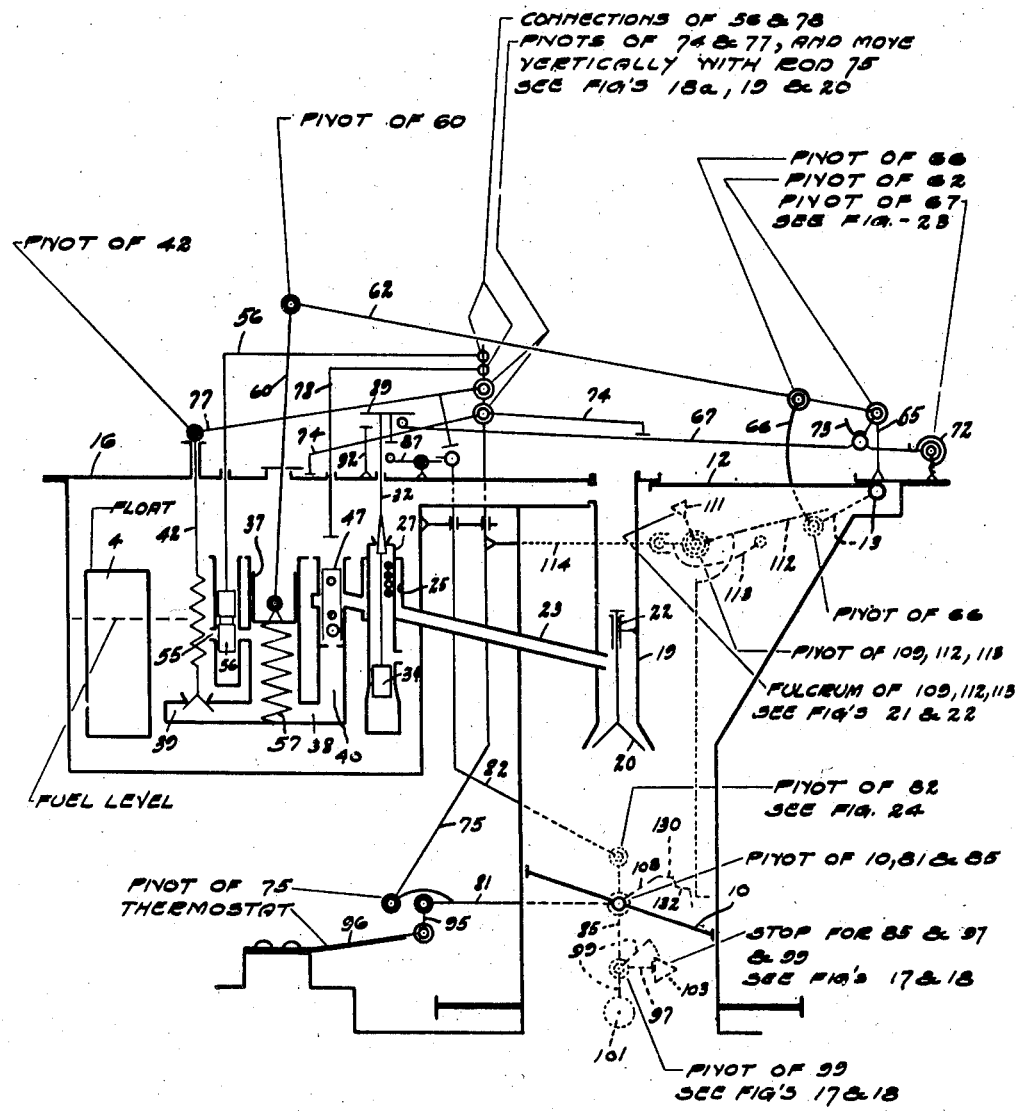
Fig. 16 is a diagrammatic view of the preferred embodiment of the invention illustrated in Figs. 1 to 11, inclusive.

Fig. 18a is a diagrammatic illustration of the throttle, the metering pin, the thermostat, the accelerating pump and associated members in the position as occupied when the engine is hot and not running, as indicated by the solid lines, and when regulated to start a cold engine, as indicated by the dotted lines;

Fig. 19 is a diagrammatic illustration of the accelerating pump, its inlet valve, the throttle and associated members in the positions as occupied when the engine is hot and not running, as indicated by the solid lines; the dotted lines A and B indicate the position of the members identified when the throttle is opened fully and the engine hot but not running; the dotted line C indicates the position of the member when the engine is cold;

Fig. 20 is a diagrammatic illustration of the accelerating pump, its by-pass valve, its discharge valve and associated members in the position as occupied when the engine is hot and not running, as indicated by the solid lines, and the dotted lines indicate the position of said parts when the engine is cold and not running;

Fig. 21 is a diagrammatic illustration of the throttle, air valve and throttle opening regulating mechanism in the position as occupied when the engine is hot and not running, as indicated by the solid lines, and the dotted lines indicate the position of said parts when the engine is cold and not running;

Fig. 22 illustrates the same mechanism as shown in Fig. 21, holding the throttle open, slightly in excess of the "hot" idling position when the engine is operating just after starting when cold, as indicated by the dotted lines;

Fig. 23 is a diagrammatic illustration of the accelerating pump, the air valve and associated members, in the position as occupied when the engine is hot and not running, as indicated by solid lines, and as regulated by full engine speed, as indicated by dotted lines;

Fig. 24 is a diagrammatic illustration of the metering pin, its stop, its regulating mechanism as operated by the throttle, and the throttle in the position as occupied when the engine is hot and idling;

Fig. 25 is an enlarged vertical sectional view, similar to Fig. 6 and illustrating a modified form of metering and pump discharge valve;

Fig. 26 is an enlarged vertical sectional view illustrating a further modified form of pump discharge valve;

Fig. 27 is a fragmentary elevational view illustrating a modification of the throttle operating mechanism shown in Fig. 7;

Fig. 28 is a fragmentary view illustrating a modified form of pump by-pass valve; and Fig. 29 is a diagrammatic illustration of the control and operating mechanism for the modification illustrated in Figs. 25 and 27, insofar as the construction thereof differs from that illustrated in Fig. 16.

This invention, as illustrated in Figs. 1 to 11, inclusive, represents the carburetor in a practical form and consists of a body casting 1, which provides as one of its functions, for a fuel chamber 2, wherein fuel is maintained at a suitable level 3 (Figs. 16 and 10), by means of a conventional float control mechanism comprising a float 4, a supporting bracket 5, pivotally mounted upon the pin 6, screwed into the body 1. The support bracket 5 engages the needle valve 7 and actuates it to and fro within the cage 8, which is rigidly secured by forcing it into the body 1. Movement of the float 4 controls the entry of fuel from a line leading to a source of supply as required to maintain substantially the fuel level 3.

The body 1 (Figs. 2, 16 and 4) is provided with a mixing passage or chamber 9, wherein air and fuel are mixed and passed downwardly to the engine. Within the mixing passage 9 and disposed at its lower extremity, is a throttle valve disc 10, secured to a throttle shaft 11. At the uppermost extremity of the passage 9 is disposed a draft actuated valve member 12, pivotally retained within the body 1 by means of the shaft 13, to which it is suitably secured. The valve member 12 is provided with a secondary valve member 14 consisting of a thin disc of spring metal riveted to the valve member 12. The disc 14 normally closes a plurality of holes 15 in the valve member 12 and is adapted to automatically uncover the said holes 15 under certain operating conditions which will later on be described.

The upper extremity of the passage 9, as well as the entire body 1, is covered by a plate 16, secured thereto and which is provided with an opening 17, which forms the entry to the passage 9 and the seat for the valve member 12. Formed perpendicularly integral with the plate 16 and equally spaced around the periphery of the opening 17, a plurality of lugs 18 are provided for the purpose of attaching a conventional air cleaner. Secured to the cover plate 16 is the tube or nozzle 19, extending downwardly into and substantially central with the lower extremity of passage or chamber 9 and forming an atomizing passage wherein the fuel to be mixed with air flowing in the passage 9 is atomized prior to entering the main stream. The bottom end of the tube 19 is conically shaped to provide a seat for a conical valve member 20, which is secured to a guide pin 21 which is vertically slidably supported by a bracket 22. The valve 20 normally is open. Extending inwardly of the tube 19, a fuel nozzle or tube 23 is so disposed that the draft through the tube 19 draws fuel and air from the nozzle 23. A passageway 24 provides communication between the upper end of tube 19 and the fuel chamber 2 so that air may enter the same.

As illustrated in Fig. 6, the body 1 is provided with a bore 25, in which is disposed the fuel metering mechanism comprising two annular members 26 and 27; a tube 28 supported thereby and closed at the bottom end thereof by a plug 29, the tube being in communication adjacent the lower end thereof with the fuel chamber 2 through opening 30, and in communication with the bore 25 through a series of apertures 31, a metering valve member 32 cooperable with an orifice in the top of member 27 for the purpose of metering air into the metering tube 28, and having a depending rod 33 to the lower end of which a piston 34 is secured and which piston cooperates with the lower portion of the tube 28 to provide a dash pot for the valve member 32.

Figure 1:
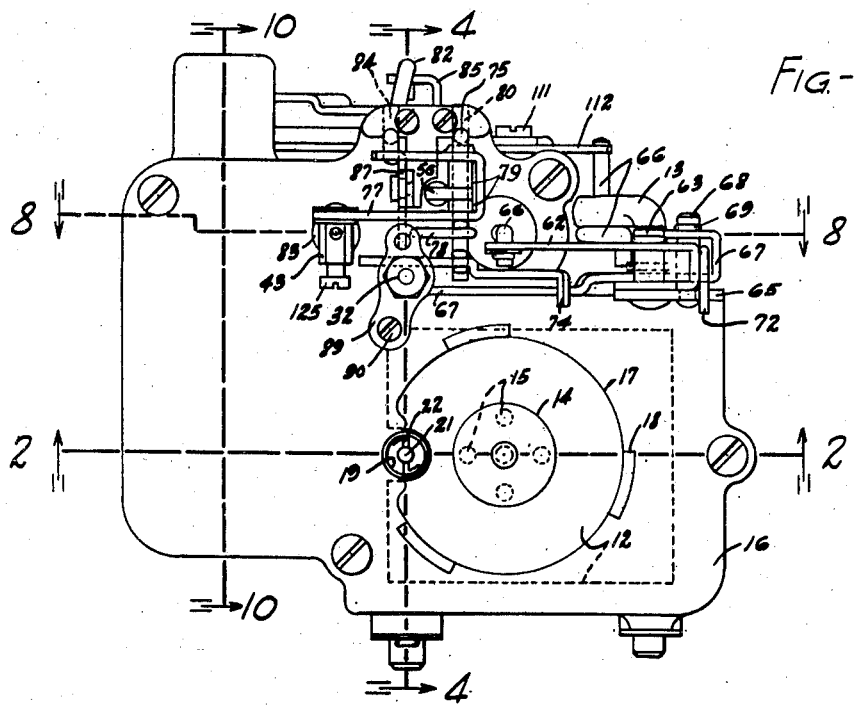
Fig. 1 is a plan view of a carburetor embodying the principles of my invention.

The body 1 (Fig. 8) is provided with a cylinder 35 of an accelerating pump, the upper portion of which cylinder is in communication with the fuel chamber 2, by means of the slot 36, for the purpose of allowing fuel, which seeps past the piston 37 of the accelerating pump, to overflow back into the chamber 2, after the piston has filled. The accelerating pump cylinder inlet and discharge passage 38 is provided in the body and is in communication with chamber 39 and the discharge valve chamber 40. The inlet valve member 41 is disposed within the chamber 39 and is secured to the bottom of a spring 42, which is secured at the upper end and outside of body 1 to a clamp 43 (Fig. 1). The upper end of the valve chamber 39 is provided with an opening leading to the fuel chamber 2 and forms the seat for the valve 41.

Within the discharge valve chamber 40 there is disposed a valve consisting of an annular member 44 (Fig. 6) forming a valve seat, a lower annular shaped guide member 45, an upper annular shaped guide member 46, and a plunger 47 slidable in the guide members and provided with a plurality of orifices 48, 49 and 50. The guide members 45 and 46 are spaced to provide a chamber 52 which is in communication with the fuel nozzle 23 by means of a passage 53, the space within the bore 25 outside of tube 28 and passage 54. The portion of the accelerating pump cylinder below the piston 37 is in communication with the fuel chamber 2 through passageway 55 (Fig. 5), controlled by a vertically movable valve member 56.

Disposed within the accelerating pump cylinder 35 and bearing at one end against the bottom of the cylinder and exerting upwardly against the accelerating pump piston 37, a conventional coil spring 57 is provided. The piston 37 is composed of an outer member 58 and an inner member 59. The outer member 58 is very closely fitted within the cylinder to provide the limit of sealing consistent with freedom of movement. The inner member 59 is rigidly secured within the outer member, and at its lower extremity is adapted to permit entry of the lower end of a connecting rod 60, and to retain the wrist pin 61, which secures the rod 60 and the member 59 together in linear relation, but permits free oscillation of the rod 60 about the pin 61. The upper end of the accelerating pump piston rod 60 is formed perpendicular to the lower portion and is pivotally connected with one end of the lever 62 (Figs. 1 and 7) and retained therein by the cotter pin. The opposite end of the lever 62 is formed substantially U shape (Fig. 1), which is pivotally mounted upon the fulcrum pin 63 and secured in place by the snap ring 64, sprung into a groove in the pin 63. The pin 63 is rigidly secured to an arm 65 (Figs. 1 and 3), formed integral with the cover plate 16. The lever 62 is connected to the shaft 13 of the draft operated valve 12, by means of the link 66, which link 66 is prevented from dislodging in one direction by the arm 62, and in the opposite direction by the shaft 13.

A lever 67 is mounted upon and pivotally secured to the fulcrum pin 68, which is rigidly secured to the arm 65. The lever 67 is retained against axial movement upon the pin 68 by the snap ring 69, sprung into a groove in the pin 68. The fulcrum or pivot end of the lever 67 is constructed substantially U-shape, as illustrated in Fig. 1, and is adapted to contain a pair of rollers 70 and the pin 71 upon which the rollers are pivotally mounted, and which are retained in place within the U-shaped end of the lever 67. The rollers lie end to end in relation to each other upon the pin 71, and their assembled length snugly spans the enclosure formed by the sides of the lever 67, thus limiting endwise movement of the rollers while permitting freedom of their rotation whereby friction between the lever 67, the spring 72, hereinafter described, and the lever 62 is practically eliminated. The pin 71 is supported by both sides of the lever 67 and is provided with a head of the same diameter as the rollers 70. The head of the pin 71 is placed between the lever 67 and the arm 65 and serves as a spacer to maintain the proper relation of the lever 67 with the lever 62, whereby the cam 73 integral with the lever 62 is kept in proper aligned engagement with one of the rollers 70. The small end of the lever 67 is disposed to actuate the metering pin 32 by force of the spring 72 when the engine is below normal temperature, or cold. The spring 72 is of coil torsion type construction, the coiled portion providing for pivotal mounting upon the pin 68 within the enclosure of the lever 67 and retained in place thereby. One end of the spring 72 is disposed under one of the rollers 70, and the other end is anchored against the upright arm 65 of the plate 16, obtaining torsional reaction whereby the spring can rotate the lever 67 and keep it in engagement with the cam 73 of the lever 62.

The action of the lever 67 is controlled by the lever 74 (Figs. 1 and 7), which is pivotally mounted upon the member 75 and retained in place thereon by conventional cotter pins. The lever 74, at the end of one of its arms, is formed perpendicular to extend over the lever 67 for actuating same. Adjacent to the fulcrum point it is offset so that its other arm will clear the metering pin 32. At the end of this arm a downwardly protruding portion 76 is provided to rest upon the plate 16, forming a pivot point about which the lever 74 tilts when actuated by the member 75 to actuate the lever 67. The lever 74, as seen in Fig. 7, has the same profile, for a portion of its length, as the lever 77.

The rod member 75 at its upper end (Figs. 16, 18a, 19 and 20) provides a pivotal connection for the members 74 and 77, as mentioned above, a support for a stop 78, and is connected to the valve 56, which is provided with a slot for this purpose, as illustrated in Fig. 7. In Fig. 1, it can be seen that the head of the valve 56 is smaller in width than the diameter of the valve, and is rectangular in shape for adapting it to the two spacing sleeves 79 on the rod 75, which hold the valve from rotating, and thereby the passage in the valve member 56 is maintained in alignment with the passage 55. The member 75 is maintained in the proper position at its upper end by the slot 80 in the plate 16, wherein it is free to move, and at its lower end is held in proper relation by the lever 81 to which it has a pivotal connection, and held thereto by cotter pins.

The lever member 77, as viewed in Fig. 1, is substantially U-shaped and is retained in place upon the member 75 by the end of valve 56. One arm of the lever 77 is provided to engage the rod member 82 (Figs. 1 and 7) and is actuated by the same when the engine is up to normal temperature. The other arm of the member 77 is provided with a substantially round end and disposed to rest upon the washer member 83, when the engine is below normal temperature, or cold. The clamp member 43 is pivotally secured to this arm of the lever, and the two members provide a means of varying the tension of the spring 42, when actuated by either of the rod members 75 and 82.

The rod member 82 is maintained in its proper position at its upper end by the slot 84 in the plate 16 (Fig. 1), wherein it is free to move, and at its lower end is held in proper relation by the throttle lever 85 to which it has a pivotal connection.

Both of the slots 80 and 84 in the plate 16 are shaped semi-circular at their inner ends to fit the rod members 75 and 82 which are held in place thereto by the bracket member 86. This member 86 is secured to the plate 16 and is provided with two semi-circular grooves which match the curvature of the rod member 75 and 82, forming, with the slots 80 and 84, a circular hole to guide these rods and allow freedom of motion of same therein.

The bracket member 86 also provides a pivotal support for the lever member 87 (Fig. 11).

The lever member 87 provides for the transmission of motion from the rod member 82 to the metering pin 32. One arm of the member 87 at its end is formed to extend under the member 82 and the other arm disposed under and in line with the stud member 88, rigidly secured to the member 89 attached to the metering pin 32.

The member 89 is also provided with a hole suitable to permit free vertical movements along the screw 90 which provides a guide to maintain alignment of the stud member 88 with the lever member 87. A sleeve 92 is disposed snugly over the screw 90 and rests upon the plate 16 to provide a stop, or seat, for the member 89 whereby the downward position of the pin 32 is fixed. The screw 90 is threaded into the carburetor body 1, as shown in Fig. 11, and rigidly secured thereby thereto, passing freely through a suitable hole in the plate 16.

The lever 81 is pivotally carried by the throttle shaft 11 and is retained in place thereon by the body 1 and the lever 85, and adjacent the end to which rod 75 is connected, a rod 95 is pivotally connected, the rod 95 being pivotally connected to a thermostatic member 96 which is secured to the hotspot of the inlet manifold of the engine. The members 95 and 96 provide a means for thermostatically controlling the cold starting mechanism. The cold starting mechanism can be manually operated, in place of the thermostatic means, and such means of manual operation would be connected to the lever 81 at the same point as rod 95. The lever 85 is rigidly secured to the throttle shaft 11 and at one end thereof is adapted to pivotal connection, at 102, with the conventional control mechanism of an automobile. The other end of the lever 85 is provided with a stop screw 97 which is adjustable to hold the throttle slightly open, whereby the idling speed of an engine is regulated. The same end of this lever is provided with a nonadjustable stop 98 regulating the full open throttle position. On to the above mentioned end of lever 85 a third stop is provided. This stop consists of lever 99 and a supporting bracket 100, the bracket 100 being secured to the lever 85. The lever 99 is pivotally secured to the bracket 100 at 110 and is provided with a weight 101 secured to one of its ends, the other end being adapted to swing into the path of the screw 97 and under conditions of operation hereinafter described, holds the throttle open in excess of that normally provided by the screw 97.

The screw 97 impinges upon a boss 103 on the body casting 1. The stop 98 is formed integral with the lever 85 and extends inwardly toward the carburetor body 1 and registers with the boss 104 integral with the body 1 of the carburetor. The screw 105 is threaded into the member 85, central with that portion of the lever 85 which straddles the throttle shaft 11, as illustrated in part in Fig. 11. The screw 105 is provided with a cylindrical portion extending through a hole in the throttle shaft, thus providing a means of rigidly securing the lever 85 to the throttle shaft 11. With the lever 85 secured as described above, and the lever 81 in place as also described hereinabove, the throttle shaft 11 is prevented from endwise movement in one direction and prevented from movement in the opposite direction by means of a conventional washer 106 and cotter pin 107.

An end of lever 85 has rigidly secured to it a cam 108, which cooperates with an arm of bell crank 109 to provide varying positions of partial opening for the throttle 10 to prevent engine stalling when cold. Lever 81 is pivotally mounted upon throttle shaft 11 and retained in place thereon by the body 1 and lever 85. Bell crank 109 is pivotally connected to the body 1 at 111 and is provided with an arm 112 which engages the laterally extending arm of link 66 (Figs. 1 and 7) for preventing the throttle from returning to the position of "hot idle" until the engine is warmed up. A lever 113 also pivoted at 111 is engageable at an end thereof with arm 112, and the other end of lever 113 is engageable with a bracket 114 carried by rod 75 for the purpose of moving the arm 115 of bell crank 109 out of the path of the cam 108 as the engine warms up.

Having specified the constituents of the carburetor, its operation will now be described in the numerical order of the following phases:

1. Automatic regulation of the carburetor preparatory to starting a cold engine.
2. Operation of the carburetor while starting a cold engine.
3. Operation of the carburetor while driving a cold engine.
4. Operation of the carburetor while the engine is warming up at idle speed.
5. Operation of the carburetor when driving an engine after it is up to normal temperature.
6. Operation of the carburetor to provide a uniform mixture at all engine speeds.

*1st phase—Automatic regulation of the carburetor preparatory to starting a cold engine*

By the phrase "cold engine" is generally understood to mean that the engine and its associated parts are below the normal operating temperature of approximately 175° F. An engine can be down in temperature to approximately 100° F. before it will require fuel in excess of the normal amount, to start, and, therefore, the thermostat 96 (Figs. 7, 16 and 18a) is so constructed that at this temperature it begins releasing the lever 67 which, by actuation from the spring 72, raises the metering pin 32 by means of lever 67 effecting an increase of the normal fuel supply by cutting down the air supply to the interior of the metering tube 27. As the temperature of the engine lowers to approximately 75° F., the thermostat 96 moves sufficiently to permit full raising of the metering pin 32 (Fig. 6), thereby closing the metering tube 27 against the supply of air thereto, which permits passage of the necessary amount of fuel for the engine to start at temperatures of 75° F. and lower. When the engine is in between the temperatures of 75° and 100° F., it will start as readily as at any lower temperature. At 75° F. of the engine, the thermostat has moved approximately one-half of its total movement, completing the above described function and also simultaneously raised the valve 56 (Figs. 16 and 20) sufficiently to shut off the accelerating pump by-pass passage 55, and partly lessening the tension on the pump inlet valve spring 42 (Figs. 16 and 19). Closing of the pump by-pass passage 55 by the valve 56, when the engine is cold, is done so that the full amount of fuel displaced by the accelerating pump is made available for the engine to facilitate starting and to enable operation of the engine at idle speed (approximately 300 R. P. M. or less) immediately after starting.

Lessening of the tension of the pump inlet valve spring 42, when the engine is cold, is done to facilitate rapid recharging of the accelerating pump whereby the draft operated valve 12 is allowed the freedom of activity needed to adequately operate the accelerating pump in maintaining the cold engine running at idle speed. As the temperature of the engine goes below 75° F., the lessening of the tension on the pump inlet valve 41 and the closing of by-pass 55 continue until a temperature of approximately 40° F. is reached, whereupon further lessening of the tension of the pump inlet valve spring 42 is stopped, since further lessening is unnecessary to keep the engine running at any lower temperature. When the engine is up to normal temperature and operating at an idle speed, the throttle valve 10 is not fully closed, but is generally said to be. A small amount of gas must be allowed to pass through to the engine to keep it running at idle speed. Since the amount of gas varies as required by an engine to idle, the screw 97 is provided on the throttle lever 85, whereby the throttle valve 10 can be set, within small variations, of a slight degree, open. This small degree of open position of throttle valve 10 will be referred to hereinafter as "the closed position."

The thermostat 96, through the rod 75, raises the valve 56, the pump discharge stop 78, the lever 74, and the fulcrum end of the lever 77 (Figs. 18a, 19 and 20). By raising the fulcrum end 121 of the lever 77, its opposite end 122 is lowered, and this lessens the tension of the pump inlet valve spring 42, as the lever tilts over the rod 82 until the said opposite end 122 seats upon the washer 83 (Fig. 7). The cam 73 cooperates with the roller 70 of lever 67 to provide a stop limiting upward movement of metering pin 32 (Figs. 7 and 18a). Rod 75 also moves lever 113 (Fig. 21) sufficient to permit arm 115 of bell crank 109 to move into the path of cam 108 after the engine has started, and the air valve 12 opened by increased draft through the carburetor and after manual opening of the throttle valve 10 (Fig. 22).

*2nd phase—Operation of the carburetor while starting a cold engine*

In Figs. 1 to 11 and 16 to 24, inclusive, the position of the constituent members is illustrated as arranged by a temperature of approximately 40° F. Illustration of the carburetor at this temperature was selected because it shows the position of all members at the beginning of their operations.

During the period of starting the engine, the draft operated valve 12 remains seated, because the amount of air needed by the engine is so small as to be freely passed through the tube 19 into the main air passage 9. Such being the case, the lever 62 and its cam 73 remain positioned as illustrated in Figs. 7 and 18a, and also, the lever 67 and the metering pin 32. With things arranged in the above relation, all of the air required by the engine flows through the tube 19, and draws fuel through hole 30 in tube 28 and upwardly within the passage 123 interiorly of tube 28 to the level of the apertures 31, through apertures 31 into annular space exteriorly of tube 28 and thence downwardly to passage 54 into the nozzle 23, tube 19, and onwardly past the throttle valve 10, which is setting at the same position of partial opening, as described above, and in this position produces sufficient vacuum within the induction system of the engine to vaporize the cold atomized fuel and thereby produces the final requirements of a cold starting mixture.

The above described state continues until the engine has received a sufficient quantity of fuel, whereupon it begins firing and promptly increases to a speed considerably above that at which it was turned over while starting. Upon increasing in speed, the engine increases the draft through the carburetor beyond the capacity of the tube 19 to pass the required amount of air, and therefore the valve 12 (Fig. 22) is opened by the force of air entering the carburetor through the opening 17 in the plate 16. The valve 12, while being opened, communicates its movement through the member 66 to the lever 62 (Fig. 23), which simultaneously is moved correspondingly and forces its cam 73 (Fig. 18a) over the roller 70 rotating the lever 67 downwardly and lowering the pin 32 within tube 27 (to the position of solid lines of pin 32 and lever 67, only), thereby reducing the flow of fuel.

The opening of the valve 12, as previously explained, also allows the bell crank 109 (Fig. 21) to swing so that arm 115 thereof contacts cam 108. It is practice in starting an engine, to open the throttle as soon as the engine starts firing, to speed up the engine above starting speed, and, after manual opening of throttle 10 (Fig. 22), the arm 115 of bell crank 109 moves into the path of cam 108 to maintain the throttle 10 open slightly in excess of the position occupied while starting, whereby, when the throttle is again allowed to close, the engine can receive fuel pulsatingly to sustain operation at a speed substantially equal to or less than hot idle speed.

Simultaneously with the above described actions, the lever 62 transmits movement through the rod 60 (Figs. 7, 8 and 18a) to the accelerating pump piston 37 (Fig. 8) so as to discharge fuel from the pump cylinder 35 and through the passages 38, 40, into the discharge valve member 47. The fuel thus being moved raises the valve member 47, permitting flow of fuel through apertures 49 and/or 50 into the passages 52 and 53, the latter of which communicates with the bore 25 which communicates with bore 54 and nozzle 23. The addition of fuel to that within the passage 54 and the nozzle 23, as previously described, causes an excess which is immediately drawn off by the suction of the nozzle 23, as previously described. This additional quantity of fuel assists the engine to immediately accelerate in speed from that at which the starting motor turns it over, to the speed to which it increases after firing starts.

After the above described action has taken place, the engine will operate momentarily at the increased speed mentioned above, and then, as the flow of fuel is reduced by the metering pin 32, as previously described herein, the engine will decelerate to a very slow speed, whereupon the draft through the carburetor, instead of being substantially uniform in velocity, occurs in impulses as each cylinder intakes, and therefore the valve 12 is caused to fluctuate in response to these impulses. This action is commonly called "flutter" and hereinafter will be referred to as such. This fluttering action of the valve 12 transmits impulses to the accelerating pump piston 37, which in turn supplies additional fuel, as previously described, and the engine, instead of stopping or "stalling," as it is commonly called and hereinafter referred to as such, will continue to operate, but at an irregular speed, hereinafter referred to as "drifting."

The above described fluttering action of the valve 12 at slow or idle speed of the engine is accomplished by lessening the normal tension of the spring 42 (Figs. 8 and 19), as previously described herein and further described hereinafter (Fig. 19), which renders the draft valve and pump freedom of movement necessary to be fully effective in keeping the engine running at or below the idle speed. The pump by-pass passage 55 (Figs. 5 and 20) is closed during this operation, as previously described.

After the throttle valve 10 has been manually opened, upon starting of the engine as described above, and thereafter allowed to close to such position as regulated by bell crank 109 and cam 108 (Fig. 22), the engine will continue to drift until it has reached normal temperature, whereupon its speed will steady and the valve 12 will discontinue fluttering, and the only fuel then flowing to the engine will be that as regulated by the metering pin 32.

*3rd phase—Operation of the carburetor while driving a cold engine*

The worst condition to be met by a carburetor is to suddenly impose a full load upon a cold engine, at idle speed, and this condition is fully provided for in the novel carburetion which this invention performs.

When imposing a full load upon an engine suddenly, the throttle valve 10 is quickly, fully opened. Assuming that the load imposed upon the engine is such that it cannot immediately accelerate above an idle speed, in such event the full open throttle allows more air to flow to the engine than was flowing at the idle position of the throttle. This increased flow forces the valve 12 from the position corresponding to idle position of the throttle, to the position corresponding to that of full throttle at the same engine speed, and, in doing so, it actuates the accelerating pump piston 37, forcing an extra supply of fuel into the engine, causing it to momentarily respond to the throttle increase, but almost immediately thereafter the engine starves because of the mixture containing too little fuel. This starved condition brings about an explosion, or series of same, commonly called, and hereinafter referred to as "backfiring." It is a purpose of this invention to bring about back-firing because the heat associated therewith conditions the induction system to prematurely stabilize carburetion. Back-firing sets up a reverse or outward flow through the carburetor, which forces the valve 12 shut, and upon closing, the valve 12 stops the outward flow of gas and confines the flame of back-fire within the carburetor and the entire induction system. The valve 20 (Fig. 4) on the end of the tube 19 also closes as a result of backfire and prevents the outrushing flow from either, forcing the fuel in the nozzle back into the fuel chamber 2, or out the top of the tube 19. The valve 20 is forced open again, partly by gravity and by air re-entering the tube 19 after back-firing ceases. Considerable pressure is occasionally associated with confining back-fires in this manner, and therefore to avoid constructing the carburetor to withstand such pressure, which would make it unduly expensive and cumbersome, the carburetor is constructed less substantial, and, by means of the valve 14, the pressure of back-fires is prevented from exceeding a safe limit by allowing the gas, through the holes 15 in the valve 12, to deflect the valve 14 slightly and thereby escape sufficiently to relieve the pressure without damage or the flame of the back-fire extending beyond the orifices 15. Back-firing occassionally occurs very rapidly, and causes rapid alternating directions of flow through the carburetor.

While each back-fire or series of same is spending itself, the engine continues to run of its own or the vehicle's momentum, and, after the back-fire subsides, the engine again draws air through the carburetor until the following back-fire again reverses the flow. In order to recover the engine before it stalls, as a result of such back-firing, the valve 12 must be capable of closing and opening in pace with the alternating flow so that by means of the accelerating pump which it operates (normally, during the discharge stroke only) it can adequately prime the engine, and toward this end the valve 12 is relieved of the full normal load of recharging the accelerating pump. Actually, it is to be understood, the valve 12 does not recharge the accelerating pump, this being done by the spring 57 which operates both, through their connecting mechanism. However, in the event of a back-fire, the outwardly rushing gas acts to force the valve 12 shut, faster than the spring 57 is capable of doing, while simultaneously recharging the pump. Therefore, the valve 12 aids in recharging the pump, and this load on the valve, were it not lessened, would prevent closing of it, or at least sufficient movement of it, to draw into the pump enough fuel to prime the engine adequately, upon reopening of the valve 12 after the back-fire has subsided.

To enable lessening of the above mentioned load on the air valve and so that the other actions, as hereinafter mentioned, may take place properly, is the purpose of the spring 42 actuating the pump inlet valve 41, and, thereby, automatic opening and varying amounts of the same are obtainable, depending on the amplitude of a back-fire, and the consequent speed at which the valve 12 is closed during the above mentioned conditions of operation. As a further aid in adequately fulfilling the conditions mentioned above, the tension or strength of the spring 42 is lessened, in the manner as previously described herein.

Recalling to mind the assumption of operation at the beginning of the description of this phase of engine operation, the engine being operated at low speed with a full open throttle, which will be understood when referred to hereinafter as below fifteen miles per hour car velocity (in high gear), the intake strokes of the engine occur so slowly that the draft through the carburetor rises and falls considerably in velocity, causing the valve 12 to flutter in pace with each intake stroke, and this fluttering action, being transmitted to the accelerating pump, causes a delivery of an abnormal amount of fuel to the engine. This extra amount of fuel enables the engine not only to run as smoothly as it would were it up to normal temperature, but it also enables it to produce all the power it is capable of at subnormal temperature.

There is a limit to the amount of extra fuel upon which an engine will properly operate while performing the above mentioned functions, and this amount is regulated by the tension of the pump inlet valve spring 42 mentioned above. This regulation is provided by fixing the tension of the spring 42, which is accomplished by pulling on the end of the spring projecting above the clamp 43 (Fig. 8), until the proper tension is reached, and then retained by tightening the screw 125 (Fig. 1). Regulation of the upward or recharging speed of the piston 37 provides for the right amount of extra fuel to be taken into the pump as required during each intake stroke of the engine in the time between the occurrence of one to the occurrence of the following intake stroke of the engine. As each intake stroke of the engine approaches completion, the draft through the carburetor keeping the valve 12 open, falls off, allowing the valve 12 to begin closing, thus permitting recharging of the accelerating pump, and, at the completion of each intake stroke, the draft falls off to nearly zero, but the valve 12, instead of completely closing in consequence, as it would were it not prevented by the restriction placed upon the ingress of fuel to the accelerating pump, closes only a small distance. Therefore, as each following intake stroke begins, the draft through the carburetor is again increased and forces the valve 12 open the amount it had closed, whereby the amount of fuel taken into the pump, as described above, is discharged into the engine.

The amount of fuel delivered to the engine during each intake stroke, while operating at low speed or flutter range, varies with the engine speed and the degree of throttle opening. When the engine is operating as described above, namely idle speed and full throttle, the largest amount of extra fuel is required and is delivered. Below and above this speed a lesser amount is needed, and the variations are automatically provided by the variations in the pulsating draft through the carburetor as described above. It so happens that at idle speed, full throttle, the variations in draft are greatest and proportionately affect the activity of the valve 12 and the accelerating pump. As the engine speed goes below that of idle, the intake strokes occur more slowly, and being of longer duration, the amount of air taken in at each stroke has more time to enter, and therefore the movement of the valve 12 is less; consequently the accelerating pump supplies a reduced amount of fuel. As the engine speed increases above that of idle, an action inverse to the above takes place, inasmuch as the intake strokes occur more rapidly, and therefore the time between each intake stroke lessens; consequently, as described previously herein, less time is available for the accelerating pump to recharge, and thereby the quantity of fuel taken in and discharged is cut down, reducing to zero (0) at an engine speed corresponding to approximately fifteen miles per hour car speed, for a six cylinder engine having one carburetor; for a four cylinder engine, or an eight cylinder engine having two carburetors, the speed is higher, and lower for an eight having but one carburetor, etc.

When an engine is operated in the above mentioned flutter range and with any degree of throttle less than full open, it requires less extra fuel, and in this event the supply is also automatically adjusted lower, by the same action as described above, and a lesser amount is supplied because the draft is lessened, which lessens the movement of the valve 12; also, the spring tension on the pump inlet valve being increased slows up the recharging speed of the pump, and these actions combined produce the lesser fuel supply mentioned.

During acceleration of the engine with either part or full open throttle, above fifteen miles per hour car speed, the draft through the carburetor increases, thereby effecting a steady flow of extra fuel from the accelerating pump, needed by the engine to produce its maximum accelerating power.

When the engine is operating under a load such as idly turning itself over when cold, with a throttle opening of the amount such as regulated by the bell crank 109 when in contact with the cam 108, the fuel mixture ratio being supplied to the engine, as regulated by the metering pin 32, is substantially equal to that of the full power fuel mixture ratio when the engine is hot. However, any degree of throttle opening in excess of the above mentioned amount of opening and up to full open throttle effects a corresponding opening of the valve 12 by increased draft and, through the medium of members 66 and 62, and particularly the cam 73, the lever 67 can be permitted to move upwardly responsive to spring 72 for lifting the metering pin 32 to increase the fuel mixture ratio, as thus effected, by diminishing the amount of air entering the tubes 27 and 28, and in this manner the engine will maintain its full power after acceleration has ceased at speeds in excess of the above mentioned fifteen miles per hour while still cold.

In the foregoing description, considerable novel carburetor action has been described, of this invention, inasmuch that certain actions mentioned cannot be performed by any conventional carburetor, past or present, and in general, none can perform the several other actions with comparable consistency and satisfaction.

*4th phase—Operation of the carburetor while the engine is warming up at idle speed*

Immediately upon firing, the heat of the exhaust gas begins to raise the temperature of the induction manifold to which the thermostat 96 (Figs. 7 and 18a) is secured, and therefore raises in temperature simultaneously therewith. Assuming that the temperature of the engine is around 40° F., when started, the constituent parts of the carburetor will be positioned substantially as illustrated in Figs. 1 to 11 and 16 to 24, inclusive, with the exception that the draft valve 12 will be open to a point where it has positioned the leading end of the cam 73 (Fig. 18a) of the lever 62, in such relation upon the roller 70 of the lever 67, that the lever 67 has lowered the metering pin 32 to the above described position of full power fuel mixture ratio when hot. Upon firing, the throttle 10 is manually opened, as described above, and then, it will be assumed, for the purpose of this part of the description, that the throttle is immediately thereafter allowed to close, stopping against the lever 109 (Fig. 22) which holds the throttle slightly open, as previously herein described, and with this amount of throttle opening, the engine will continue to operate until thoroughly warmed up. To those experienced in this art, it will be readily understood that an engine in most cases would not operate continuously under the above described conditions of fuel quantity, but by the means of this invention, acting as above described, enables the engine to automatically "prime itself," as it were, through the fluttering action of the air valve 12, the cooperation of the accelerating pump, and the throttle position, as the engine approaches such slow speed as to be on the verge of stopping or "stalling"; therefore, before stalling occurs, the engine primes itself, and upon receiving sufficient fuel immediately increases in speed until the primed fuel is consumed, whereupon it immediately slows down again and is reprimed, as above described. This action, hereinbefore named "drifting," continues until the engine approaches substantially the semi-warmed up temperature, whereupon it runs at a uniform, but somewhat higher speed, than when first started or while cold.

While the engine is warming up, the thermostat 96, through the medium of the lever 81 and the rod 75, moves the lever 74 downwardly, which, by means of the turned-over end thereof, engages the lever 67 (Figs. 1, 7 and 18a), lowering same, which in turn lowers the metering pin 32 to a final position corresponding to a fuel mixture known as the "economy" mixture.

When the lever 67 is finally fully lowered, due to the action of thermostat 96, the roller 70 thereof is out of engagement with the cam 73 of the lever 62, and the metering pin 32 is then resting upon the sleeve 92 (Fig. 11), which regulates the metering pin 32 to its position within the tube 27 (Fig. 6), providing the "economy mixture" mentioned above.

Simultaneously with the above described actions, the valve 56 (Figs. 4, 5 and 20) is lowered by thermostat 96 until the port hole 120 registers finally with the center of the passage 55, and thereby the accelerating pump is put in communication with the fuel chamber 2 under operating conditions up to ten miles per hour car speed (high gear), to prevent the pump from supplying unwanted fuel to engine during irregular running of the engine at idle speed and with the throttle closed, during which operation stalling of the engine can otherwise occur. Above ten miles per hour operation, the piston covers the passage 55, and by-passing ceases.

Also, simultaneously with the above mentioned actions, the stop 78 (Figs. 1, 8 and 20) is lowered, by thermostat 96, to reduce the lift of the pump discharge valve piston 47, limiting it to a lift whereby only the ports 49 and 50 can register with the passage 52 and 53 (Figs. 6 and 8). These ports 49 and 50 provide a variable discharge outlet from the pump to meet the varying requirements of engine operation. The port 49 provides for a metering of a very small amount of fuel to the engine in excess of the normal mixture during substantially full power output of engine at speeds corresponding to that of idle, or below, whereby exceptional smoothness of engine torque is obtainable and therefore power from the engine in excess of that obtainable with a carburetor not possessing the feature embodied in this invention. The port 50 provides a metering orifice larger than 49 to pass sufficient fuel to engine to meet the requirement of quick acceleration, and under this operating condition it is at times necessary to by-pass some fuel that the pump discharges, and toward this end the port 48 is provided and extends above the sleeve 46 and communicates with the fuel chamber 2.

When the engine is cold, it requires larger accelerating charges from the pump and toward this end the stop 78 is raised by the thermostat 96 as previously described, which then allows the valve piston 47 to raise until its lower extremity is substantially level with the lower end of sleeve 46 thereby greatly increasing the area of discharge and volume of fuel delivered to the engine. Simultaneously, also, with the above described actions, the fulcrum end 121 of the lever 77 is lowered by thermostat 96, tilting the lever 77 over the top of rod 82 (Fig. 19), thereby raising the other end 122 and increasing the tension on the pump inlet valve spring 42, which in turn regulates downwardly, fluttering of the air valve 12, hereinbefore described, by increasing the restriction upon the entry of fuel to the accelerating pump. Maximum restriction being placed upon the entry of fuel to the pump when the throttle is closed and/or nearly so, however, the air valve 12 is free to flutter at engine speeds below a corresponding car speed of ten miles per hour, when hot, but due to the pump by-pass passage 55 being open, no fuel is delivered to the engine.

When the throttle valve 10 is opened, the rod 82 connected therewith (Figs. 7 and 19) is moved downwardly (indicated by dotted lines A and B) and thereby also the end 122 of lever 77 which in turn lessens the tension on the pump inlet valve spring 42, allowing slight fluttering of the air valve 12 and thereby slight fuel delivery by the accelerating pump in proportionate amounts to throttle opening.

Simultaneously also with the above described actions, the lever 113 (Figs. 7 and 21) is moved by the bracket 114 so as to disengage the arm 115 (indicated by the solid lines, Fig. 21) of the bell crank 109 from the cam 108 to permit full closing of the throttle 10. The flats 130 and 132 on the cam 108 provide for varying positions of slight throttle opening as regulated by thermostat 96.

*5th phase—Operation of the carburetor when driving an engine after it is up to normal temperature*

Relatively few engines can drive a car at idle speed with uniform velocity, in direct drive, on ordinary level roadways, which, in other words, means that the average engine speed is quite irregular, during such operations and effects, a non-uniform draft through the carburetor, which in turn, with a carburetor of this character, would cause extra fuel delivery to the engine, were such not prevented. The amount of fuel supplied to the engine at idle speed, closed throttle, is of necessity for the engine to operate satisfactorily, such, that not a bit more can be added to the supply, and, therefore, when the draft through the carburetor is irregular, as mentioned above, the effect upon the draft valve 12 transmitted to the accelerating pump effects a discharge of fuel, but by means of the valve 56 (Figs. 4, 5 and 20), the discharge is prevented from going to the engine. The passage 120 in the valve 56 permits free by-passing of fuel from the pump, back into the fuel chamber 2, through the passage 55, during slight flutter of the valve 12, such as described above. The passage 55 is located in such relation to the bottom of the piston 37 that it is shut off by the piston 37 as it travels downward to a position corresponding to, arbitrarily, ten miles per hour car speed on level roadways, after which all the fuel displaced by the piston is available for the engine. At this speed, and above, the intake pulsations of the engine (six-cylinder engine), as previously explained, occur in rapid succession and therefore and also because the throttle opening is so small at this speed, the activity of the valve 12 and the accelerating pump is not sufficiently affected to cause a delivery of fuel to the engine, unless the car is accelerating; in which case the draft through the carburetor is steadily increasing rather than fluttering. In addition to this control of fuel from the accelerating pump, additional control is effected by the tension of the pump inlet valve spring, as previously explained.

When a load is put upon an engine in excess of that required to operate a vehicle on level roadway at idle speed, part open throttle, the draft through the carburetor is increased proportionately with the loading, effecting larger opening of the valve 12 and a relatively lower positioning of the piston 37 of the accelerating pump, and therefore, the corresponding car speed at which the piston 37 cuts off the by-pass passage 55 lowers accordingly, even to that of idle speed, if a full load is placed upon the engine at this speed; in which case the draft through the carburetor is increased to where the valve 12 lowers the piston 37 slightly beyond fully cutting off the passage 55. If full loading of the engine is done slowly, the movement of the accelerating pump is correspondingly slow, and the fuel displaced thereby freely flows back into the chamber 2, until the piston 37 passes the shut-off position and from there on the fuel displaced is available for the engine, but, if a full load is put upon the engine suddenly, movement of the piston 37 then becomes too rapid for the small passage 120 in the valve 56, to freely by-pass all the fuel being displaced, and the pressure on the fuel associated with such movement of the piston 37 imparts motion to the fuel within the pump and the passages 38 and 40, whereby the pump discharge valve piston 47 is raised until either of the ports 49 and 50 register with the outlet passage 52, and the required amount of extra fuel is thus made available for the engine to respond accordingly.

While the throttle is being opened fully, the rod 82 (Figs. 7 and 24), attached to the throttle lever 85, is lowered, and thereby the lever 77, by force of the pump inlet valve spring 42, is lowered, and the tension of the spring 42 is lessened to permit sufficient fluttering of the valve 12 whereby the accelerating pump supplies fuel as long as running is continued at idle speed. However, if the speed is increased with either full open or a lesser opening of the throttle, extra fuel continues to be supplied, pulsatingly, varying only in quantities depending on throttle opening, upward to approximately fifteen miles per hour car speed with full open throttle, and proportionately less speed with less throttle opening, and, if the speed is extended beyond this, even up to top speed, the increased but steady draft through the carburetor steadily continues opening of the valve 12, maintaining a steady supply of extra fuel required by the engine for maximum accelerating power; the extra supply of fuel ceasing only when top speed is reached, or below this speed, depending upon the degree of throttle opening.

During operation of the engine at the "fluttering" speed where impulse feeding of fuel occurs above mentioned and particularly at a speed of one mile per hour with throttle opening in excess of one quarter of full open, up to full open, considerable extra fuel is supplied to engine and accumulates in the induction system, and under such condition, the throttle is allowed to close suddenly, stalling of the engine would result before it could consume or dispose of the said accumulated excess fuel. As a means toward overcoming this effect of impulse feed of fuel, the throttle is prevented from closing fully, when allowed to "suddenly" close as mentioned above, by the lever 99 (Figs. 17 and 18), which, under the influence of gravity upon the weight 101, is held in the position shown in Fig. 17, or vertical at any motionless position of the throttle lever 85, along the circular path the throttle lever describes in its movement. However, when the throttle lever is suddenly allowed to close, the inertia of the weight 101 causes clockwise rotation of the lever 99 about its fulcrum 110, as its fulcrum is moved by the throttle lever 85 in the closing direction, resulting in that the end of the lever 99, opposite its inertia end, is moved into the path of and impinged against the throttle stop 103, Fig. 18, where it is held by the conventional throttle closing action as employed on automotive vehicles. In this manner the throttle is held open slightly in excess of the said idle position whereby the engine will continue running, at an extremely low speed, until the excess fuel in the induction system has been drawn off or disposed of, whereupon the engine speed will increase up to normal for such said corresponding open position of the throttle. The lever 99 is released and allowed to restore to the position as shown in Figs. 7 and 17 by slight re-opening of throttle and after which throttle will close completely.

*6th phase—Operation of the carburetor to provide a uniform mixture at all engine speeds*

Conventional carburetors, in general, are classified as either plain tube type, or air valve type, with respect to the means employed in producing a uniform mixture of air and fuel, at all engine speeds, by the action of the air flowing through the carburetor. These two types of carburetors, individually, are equally limited with respect to the amount of air they will pass at a given pressure and size. However, to combine the principles of both into a single carburetor of an equal given size, as is done in this invention, the combination will pass a greater amount of air for an equal given pressure, whereby increased speed and power can be obtained from an engine.

In this invention, referred to Figs. 1 to 11, the tube 19 admits air into the carburetor main air passage 9, at all times, and also constitutes a large fuel nozzle, and the small or lower end of the passage 9 cooperates with the lower end of the tube 19 to provide partial vacuum within the tube 19. The valve 12 in this invention performs the equivalent function of the air valve in conventional carburetors, but differently, in that it lessens the resistance to entering air, upwardly of idle speed on up to top speed, whereat the resistance is practically zero as it comes to a stop, full open, on the projection 133 within the passage 9. This action of the valve 12 is made possible when using a conventional spring 57 (Figs. 8 and 23), by the arrangement of the fulcrum C of the lever 62 (Fig. 23) in vertical alignment with the center D of the shaft 13 of the valve 12, and also by attaching one end of the link 66 to the lever 62 and the other end to the shaft 13 at the relative position illustrated in Figs. 7 and 23. By this arrangement, a force line A passing through both ends of link 66 is further away from the center D of shaft 13 when the valve 12 is closed, and therefore the spring 57 will exert more of its force while at its weakest strength, upon the valve 12, than when valve 12 is full open (as indicated by the dotted lines) whereat the force line B is nearest to the center D of shaft 13. It appears that immediately after idle speed of the engine at which the peak resistance of the valve 12 exists, the increased draft through the carburetor would force the valve 12 fully open, but such is not so, because the angle of the valve 12 with respect to the directional flow of air changes constantly, and therefore, while the draft is increasing, its impact force upon the valve 12 is decreasing.

At top engine speed the velocity of air flow through the carburetor is sufficiently fast to draw the required amount of fuel from an unshrouded nozzle projected into the main stream at an angle substantially the same as illustrated in Fig. 4, and such an arrangement also functions satisfactorily for speeds somewhat less than top speed, but, from such a point on down, the velocity of flow falls off too rapidly in proportion to the engine speed, and sufficient fuel no longer can be drawn from the nozzle. Therefore, in this invention, the tube 19 is provided around the end of the nozzle 23, whereby the proper proportional velocity decrease of air passing over the nozzle 23 occurs by the cooperation of the main air stream velocity within the passage 9 and the valve 12, as the engine speed is lowered.

Figure 2:
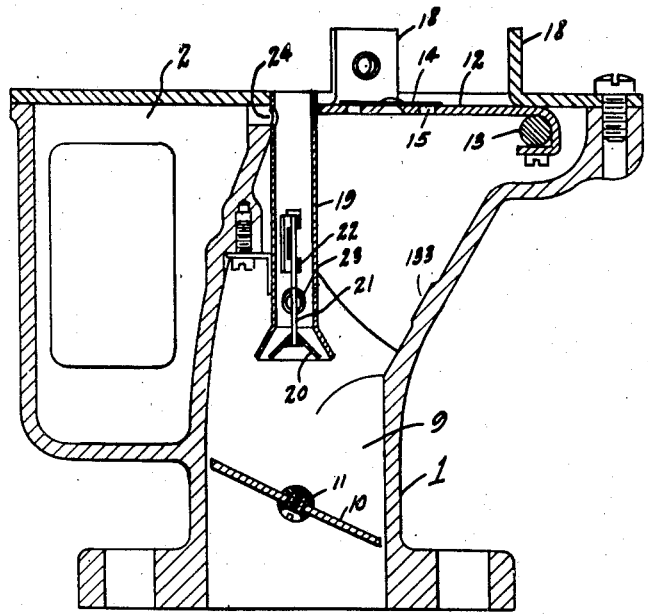
Fig. 2 is a vertical sectional view taken along the line 2—2 of Fig. 1.

Enshrouding the nozzle end with the tube 19 changes somewhat the characteristic of drawing fuel from the nozzle, as explained above, inasmuch as the velocity of air passing the nozzle does not alone set up the necessary depression at the nozzle end to draw the required amount of fuel, but merely aids the depression within the tube 19 between the nozzle and the lower end of the tube, the combined action creating the required depression at the nozzle. The velocity of the air flowing in the passage 9 at high engine speeds nearly reaches its peak in the vicinity of the end of the tube 19 and thereby in passing creates a "depression cone" starting at the end of the tube and extending beyond it into the air stream. This cone effects a depression upwardly within the tube 19 which partly effects drawing fuel from the nozzle 23 and partly aids in increasing the flow of air from the top of the tube 19, past the nozzle 23. By disposing the top of the tube 19, as illustrated in Figs. 2 and 9, a portion of the air stream entering the opening 17 is directed into the tube 19 with considerable impact at high engine speed and thereby aids the above mentioned depression within the tube 19 in passing air over the nozzle 23 at proper velocity.

As the air velocity through the passage 9 is lowered below that of top engine speed, the depression cone, mentioned above, becomes proportionately less and proportionately lessens the depression within the lower portion of the tube 19, drawing proportionately less fuel from the nozzle 23; however, the tube 19 in effecting the required flow of fuel from the nozzle 23, suffers the same as the nozzle alone, as explained previously. Therefore, in order to maintain the necessary depression at the end of the tube 19, while the depression cone lessens, as explained above, resistance by the air valve to entering air is provided, as previously explained, to begin increasing, and thereby starts a partial vacuum within the passage 9, between the throttle valve 10 and the main air entry 17, whereby the cooperation of the said partial vacuum and the said depression cone effect a proportionately less supply of fuel as the engine speed goes down, the valve 12 cooperating increasingly with the decreasing velocity of the air passing the end of the tube 19.

At idle speed of the engine, the least amount of fuel is required, and therefore the least depression is provided in the nozzle 23 by the metering valve 32, hereinafter fully described, but, as the engine speed is increased by increased throttle opening, more fuel and air are required and the valve 32, in resisting the entry of air into the tube 27, increases the depression therein, as supplied by nozzle 23, and more fuel is drawn from the nozzle 23 and simultaneously the depression cone at the end of the tube 19 builds up due to increased air flow in passage 9. This action continues upwardly to top speed, where the valve 12 offers its least resistance to entering air, while the depression cone is increased to maximum by the high velocity of air passing, and at top speed supplies all the effort to draw from the nozzle 23 the required amount of fuel.

All carburetors of present time are required to supply two mixtures for normal running: the one having the lesser percentage of fuel content is generally called the "economy mixture," while the second containing a higher percentage of fuel is generally called the "power mixture." The first, or economy mixture, will operate an engine satisfactorily at all speeds, but due to its lack of sufficient fuel content, the engine cannot put out maximum power. Since it is necessary to fully open the throttle valve of the carburetor, in order that an engine may intake all the mixture possible for maximum power, the second, or power mixture, is generally controlled by the throttle action so that as the throttle is opened from, arbitrarily, one-third to full open, the power mixture is brought into play. In this invention the economy mixture is provided by lowering the metering pin 32 within the tube 27 until the least amount of fuel required is passing to the engine, after which the setting is fixed by tightening the nuts 140 and 141 (Fig. 11). From this position the metering pin 32 (Fig. 24) is raised until the required amount of fuel for full power is flowing, and this is provided as the throttle valve 10 is fully opened, by the movement of the throttle lever 85 which transmits its motion through the rod 82 (Fig. 7) to one end of the lever 87 (Fig. 11), tilting its opposite end upwardly into engagement with the stud 88 and thereby raising the metering pin 32 the necessary amount, as the throttle lever moves from approximately one-third to full open of the throttle valve 10.

The metering pin 32 moves with the throttle 85 at all times, varying the amount of air admitted into the tube 28 and thereby varying the depression within the tube 28 whereby the level of fuel within the said tube is made to vary, which level in turn submerges one or more of the orifices 31 and thereby the quantity of fuel allowed to the engine varies, depending on how many of the orifices 31 are submerged. These orifices are submerged in proportion to throttle opening and engine speed, i. e., at full throttle, top engine speed, all of the orifices may be submerged, while at idle engine speed and full open throttle only two of the orifices 31 may be submerged. The increase of air velocity passing the lower end of tube 19, above idle engine speed, on up to top speed, with part to fully opened throttle, increases the depression within the tube 19, the nozzle 23, and the tube 28, whereby, without any movement on the part of the throttle (after fully opened) and the metering pin 32, the above described action raises the fuel within the tube 28, above explained.

In Fig. 12 there is disclosed a modification of the invention showing the application thereof to a plain tube type carburetor. In this figure the parts are diagrammatically illustrated, and except for the fact that two fuel nozzles are provided for delivering fuel to the mixing chamber, the parts may be constructed and arranged substantially as illustrated in connection with the modification illustrated in Figs. 1 to 11. The mixing chamber 208 is adapted to be supplied with fuel from an idling passage 200 and from the main fuel passage 219. A valve 201 is adapted to control the supply of fuel to the nozzle 219, and the valve 201 is connected to the throttle 210 in such a manner that the passage 219 is closed until the valve 201 is opened to a degree of opening where the passage 200 no longer supplies the full amount of fuel required by the engine, whereupon the valve 201 is opened by the throttle, allowing the passage 219 to begin supplying the necessary amount of fuel. The valve 201 remains open beyond the above described position of the valve 210 while the valve 210 is being fully opened. The operation of the remaining mechanism is substantially the same as that described in Figs. 1 to 11.

The remainder of the carburetor diagrammatically illustrated in Fig. 12 comprises an accelerating pump 237, similar to the accelerating pump 37, 35 illustrated in Figs. 1 to 11, a valve 241, similar in construction and operation to the valve 41, a pump discharge metering valve 247, similar to the pump discharge metering valve 47, and a draft actuated valve 212, similar to the draft actuated valve 12.

In Fig. 13 there is illustrated a modification of means for delaying complete closing of the throttle 10. This means comprises a throttle lever 285 and an adjustable stop 297 therefor, cooperable with a dashpot, indicated generally at 300, which is adapted to cooperate with the stop 297 so as to delay the final closing movement of the throttle connected with the lever 285, the dashpot being provided with a suitable piston having a head 301 which is adapted to be engaged by the end of the adjustable stop 297. As the throttle is opened, the lever 285 moves in a counterclockwise direction, and the end 302 thereof engages the head 301 of the dashpot piston for moving the same outwardly, as a result of which outward movement liquid fuel will flow from the fuel chamber through the passage 303 into the cylinder of the dashpot and through a cross passage 304 of the dashpot piston to the space beyond the valve 305 to occupy the space left vacant by the piston upon the outward movement thereof.

In Fig. 14 there is illustrated a modified form of construction for the lever 67 of Fig. 7, in which a bimetallic strip 310 is incorporated in the lever 67 so as to position the metering pin 332 similar to the metering pin 32 responsive to the temperature conditions existing around the engine at the time of starting and immediately thereafter.

Fig. 15 diagrammatically illustrates a modification of the invention provided with means for changing from an economy mixture to a full power mixture substantially instantaneously, regardless of the degree of throttle opening. This means comprises a throttle lever 385, similar to the throttle lever 85 of Fig. 7, a draft actuated valve lever 313, similar to that of the draft actuated valve lever 13 of Fig. 7, a metering pin 332, similar to the metering pin 32 of Fig. 7, and a lever 387, similar to the lever 87 of Fig. 11. A spring 314 is provided for actuating the lever 387 in one direction of movement thereof, and a connecting link 315 is pivotally connected to one end of the throttle lever 385 and pivotally connected also to one end of the link 316, the other end of the link 316 being pivotally connected to the draft actuated valve lever 313. The link 316 is provided with a cam 317 for the purpose of actuating the lever 387.

The operation of this device is based upon the fact that for any degree of throttle opening, the draft actuated valve positions the lever 313 to a position corresponding to the said degree of throttle opening. However, this said positioning of the lever 313 corresponding to the said opening of the throttle lever 385 occurs only when the engine speed, by reason of a lessening of the load upon the engine, increases to a point corresponding to what is commonly called a "cruising" load. In view of the above described action, when the throttle lever 385 is opened quickly, the cam 317 is lowered correspondingly, and the lever 387 is therefore allowed to tilt about its fulcrum by action of the spring 314, thereby raising the metering pin 332 and producing a full power mixture. The maximum movement of the lever 387 is limited to only such movement as effects full power mixture, while the cam 317 may have been moved a distance considerably greater than the above mentioned movement of the lever 387 while the throttle was opened by movement of the lever 385. However, the following-up movement of the draft actuated valve lever 313 moves the levers 315 and 316 and the cam 317 into re-engagement with the lever 387, thereby tilting the lever 387 and lowering the metering pin 332 to re-establish an economy mixture for that particular degree of throttle opening, as explained above. However, when the throttle is moved to the full open position, the following-up movement of the draft actuated valve lever does not bring the cam 317 into re-engagement with the lever 387 as the engine reaches top speed, so that the full power mixture remains at that speed, thereby enabling the engine to put out its maximum power.

Referring now to Figs. 25, 27 and 29, there is illustrated a modified form of construction of the normal fuel metering means, certain of the controls therefor, and the discharge valve for the pump.

Fig. 25 is a fragmentary view similar to Fig. 6 and discloses a modified form of normal fuel metering means and discharge valve for the pump. In this modification the body of the carburetor is provided with a bore 425 in which a tubular member 427 is fitted. A sleeve 429, fitted within the bottom end of the member 427 and projecting therefrom, is seated on the bottom end of the bore 425. The interior of the tubular member 427 is provided with a restricted portion 431 which cooperates with a movable valve member 433 for regulating the flow of liquid fuel from the liquid fuel reservoir 435 into the upper part of the tubular member 427. A pipe 437 is fitted into the upper end of the member 427 and extends to a point above the level of fuel 439 in the reservoir. A sleeve member 441 is fitted into the upper part of the bore 425 and provides a space around the upper end of the pipe 437 from which liquid fuel may flow in response to the suction produced in the mixing chamber 443 (Fig. 29). The bore 425 communicates with the mixing chamber 443 through passageway 445 formed in the body of the carburetor and communicates at one end thereof with the bore 425 and at the other end thereof with a nozzle 447 (Fig. 29), the construction of which nozzle may be similar to that illustrated in Fig. 4. The mouth of the nozzle 447 flares outwardly and terminates adjacent the throat of the mixing chamber 443 and is provided with a check valve 449 similar to the valve 20 of Fig. 4. The nozzle 447 differs from the nozzle 19 in that the nozzle 447 does not communicate with atmosphere except through the passageway 445 and the air metering valve hereinafter described. The air metering valve indicated generally at 450 comprises a bushing 452 providing an air entry passageway 460, said bushing being fitted in one end of the sleeve 441, and a movable valve member 454. The movable valve member 454 comprises a tapered pin which, as illustrated in Fig. 25, is seated on the inner upper edge of the bushing 452 which forms the air entry port and so as to close the same, thereby preventing the entrance of air into the fuel metering means which consists of the parts heretofore described. The pin 454 is provided with a stem 456 on which the liquid fuel regulating valve member 433 is formed. The lower end of the stem 456 below the valve 433 may be provided with a piston 458 which cooperates with the sleeve 429 to provide a dashpot similar to that illustrated at 34 in Fig. 6 and for essentially the same purpose. The interior of the bushing 452 which forms the air entry port or passageway comprises a Venturi-shaped passageway of fixed length and of varying cross section, at least throughout a part of its length.

When the valve member 454 is moved upwardly, the air entry passageway 460 formed between the pin 454 and the bushing 452 will control or regulate the amount of air entering the fuel metering means for the purpose of controlling the amount of fuel discharged from the upper end of the pipe 437 responsive to the suction in the mixing chamber 443. As the valve member 433 moves relative to restricted portion 431 and with the pin 454, the fuel entry passageway between members 431 and 433 will be varied for controlling or regulating the amount of liquid fuel entering the fuel metering means for the purpose of controlling, at least in part, the amount of fuel discharged from the upper end of the pipe 437 responsive to the suction in the mixing chamber 443. As the air metering valve opens beyond the position of the pin 454 for "part power-cold," the liquid fuel metering valve members 431, 433 will be positioned to restrict the flow of liquid fuel into the fuel metering means until the pin 454 reaches the position for "part power-hot." Further opening movement of the pin 454 will move valve 433 relative to portion 431 so as to increase the size of the opening therebetween, thereby permitting increased flow of fuel into the fuel metering means. The upper end of the pin 454 may be formed to provide a collar 462 by means of which the pin 454 may be moved, and a guide 464 suitably supported by the carburetor body is adapted to cooperate with an upper stem portion 466 of the valve member 454 for guiding the same upon movement thereof.

In the diagrammatic illustration shown in Fig. 29 of the operating and control mechanism for the air metering pin 454, insofar as the same differs from the construction shown in Fig. 16, the various amounts which the metering pin 454 is raised off its seat to provide the various fuel mixtures required by the engine are indicated by the series of dotted lines immediately above the collar 462. In the position in which the air metering valve member 454 is shown in Figs. 25 and 29, the fuel metering means is set for supplying to the engine a rich mixture for starting a cold engine. In this position the air metering valve 450 is closed. The valve member 454 of the air metering valve 450 is moved by the thermostat, and the throttle, as will hereinafter be described, to permit the flow air through the passageway 460.

In lieu of the arm 67 which operated to adjust the air metering valve of the construction shown in Fig. 16, the construction shown in Fig. 29 is provided with an arm 467 pivoted at 468 and an arm 469 pivoted at the same place. The free end of the arm 469 is engageable with the under side of the collar 462 for raising and lowering the metering pin 454. A tension spring 470 connected to the arms 469 and 467, as illustrated, and a stop 472 will cause the arm 469 to move downwardly when the arm 467 moves upwardly and will tend to cause the arm 469 to move upwardly when the arm 467 moves downwarly. The free end of the lever 467 is engaged and actuated by the cam 73. Insofar as the parts of the construction illustrated in Figs. 29, 25, and 27 are the same as those illustrated in Fig. 16, the same reference characters have been used. The cam 73 is adapted to be moved by the air valve 12 upon movement thereof through the medium of links 13, 66, and 62. Therefore, it will be seen that as soon as the air valve 12 opens, due to the starting of the engine, cam 73 will, through the levers 467 and 469, raise the pin 454 off its seat into a position where the collar 462 will assume the position shown in dotted lines and designated "part power-cold." This phrase "part power-cold" has reference to the operation of a cold engine with the throttle 10 partially open. Means are provided in this modification to prevent full opening of the throttle 10 when the engine is cold and which comprises a stop 476 carried by the thermostat 96 and which is adapted to obstruct the path of an arm 478 carried by and movable with the throttle 10 so as to prevent the full opening thereof when the engine is cold, in order to facilitate better vaporization of the fuel in the induction system.

A link 482, similar to the link 82 of Fig. 16, is connected at one end to the throttle valve 10 so as to move therewith and adjacent its other end is provided with an arm 484 which is adapted to engage an arm 486 carried by a lever 488. The lever 488 is pivoted at 490 and is provided with an arm 492 which is adapted to engage the arm 469 for moving the same downwardly so as to lower the metering pin 454 upon opening of the throttle. It is apparent that considerable opening movement of the throttle can take place before any movement of the metering pin 454 takes place in the downward direction, so that only the last few degrees of throttle opening before striking the stop 476 moves the metering pin 454 from the position it was in to its new position or, as otherwise stated, from the position of "part power-cold" to "full power-cold."

In this new position of "full power-cold," the flow of air through the air metering valve 450 is further restricted, and hence the mixture supplied through the fuel metering means will be richer than that supplied before the metering pin was lowered. This lowering of the metering pin from the position indicated as "part power-cold" to a position indicated as "full power-cold" occurs upon opening of the throttle when the engine is warming up. "Full power-cold" has reference to the condition of an engine before the same is warmed up and operating with a full open throttle as limited by stop 476. In the event that the engine becomes "flooded" with excess fuel due to faulty or accidentally wrong starting routine, while trying to start a cold engine, the engine can be "aired out" by moving the throttle open until it is stopped by the stop 476 as above described. When the throttle has been so moved, the "richness" of the cold starting mixture is "leaned" out and the starting of the engine facilitated due to the fact that more air passes to the engine, since the throttle is nearly wide open. As the throttle 10 approaches the stop 476 the end 496 of the link 482 engages the arm 467 and moves it the same amount it is moved by the cam 73, when the cam 73 has fully acted upon the arm 476. Simultaneously with movement of the arm 476 by the link 482, the lever 488 is moved by link 482 as the arm 484 engages the arm 486, and moves arm 469, stretching the spring 470 and thereby positioning pin 454 to the same position corresponding to its "full power-cold" position, whereby an abnormal amount of air is allowed to enter the fuel metering system which results in a leaner mixture passing to the engine as before mentioned. The thermostat 96, upon warming up of the engine, will lower the pivot point 490 and move the arm 486 out of the reach of the arm 484 so that during normal hot operation of the engine the arm 488 is not moved by the arm 484.

An arm 494, carried by the arm 475 which is connected to the thermostat 96, is adapted to engage the arm 467 and move the same downwardly, thereby moving the arm 469 upwardly so that when the engine is hot the collar 462 of the metering pin will assume the position indicated as "part power-hot." The arm 475 is provided with a stop collar 475' which is adapted to engage the guide 475" for the purpose of definitely positioning the metering pin 450 at the aforesaid "part power-hot" position. In this position the metering pin is set for providing a fixed size of opening for the flow of air through the metering valve 450 during the hot operation of the engine and will remain in this position so long as the engine remains hot or until the arm 467 is engaged by the end 496 of the link 482, which will happen when the throttle 10 approaches its fully open position. Further opening movement of the throttle will cause arm 467 to raise the metering pin 454 from the "part power" position to "full power" position. When this occurs, the collar 462 will move to the position indicated as "full power-hot."

The amount of opening provided by the relative position of the pin 454 for "part power-hot" will provide an economy fuel mixture for the engine, including idle and off-idle operation, whereas that provided by the positioning of the pin 454 for "full power-hot" will provide a full power mixture for the engine under all operating conditions.

Due to the shape of the pin 454 and the shape of the inside surface of the bushing 452, it will be seen that in each position of the pin 454 the shape and size of the passageway 460 afforded between the pin 454 and the bushing 452 will be different. The shape of the passageway 460 in each position of the pin 454 is designed to pass the requisite amount of air through the passageway 460 so as to produce a fuel mixture which is adapted to produce desired engine performance under the various conditions of temperature, load and throttle to which it may be subjected.

In Fig. 27, which is a fragmentary view similar to a part of Fig. 7, the means for preventing the full opening of the throttle when the engine is cold, are illustrated and comprise a lug 478 formed on the throttle arm 85 and a lug 476 carried by the thermostat arm 475. The construction shown in Fig. 27 is otherwise the same as that illustrated in Fig. 7. When the thermostat warms up, the lug 476 will be moved downwardly and out of the path of travel of the lug 478, which travels in an arc about the pivot point 479.

Referring now to Fig. 25, a modified form of discharge valve for the pump is illustrated and comprises a sleeve 500 fitted into a bore in the carburetor body, the upper end of the sleeve terminating adjacent the end of the passageway 445 which communicates with the bore. Another sleeve 502 is fitted into the upper end of the bore and has its lower end spaced from the upper end of the sleeve 500. A piston 504 is slidably mounted in the sleeves 502 and 500 and normally assumes the position illustrated in Fig. 25. The piston 504 is hollow and at its lower end is provided internally thereof with a valve seat 506 for a ball valve 508. The piston also is provided with a fuel port 510 which is adapted to permit the flow of fuel from the interior of the piston into the space between the adjacent ends of the sleeve 500, 502 when the piston has been raised. The interior of the piston also is provided with an upper valve seat 512 for the ball valve 508 so as to prevent the flow of fuel upwardly through the piston 504 when the ball valve 508 is seated on its upper seat. The stop 78 is shown in full line position in which it is set when the engine is cold and in dotted line position in which it is set when the engine is hot. The stop 78 is moved by the thermostat (Fig. 16).

Fuel from the pump is supplied through the passageway 60 to the openings in the sleeve 500 and the piston 504, and this fuel first raises the ball 508 off its seat and moves the same upwardly until it seats upon the valve seat 512. Then the piston 504 moves upwardly until the aperture 510 communicates with the space between the sleeves 500, 502, and the passageway 445, thereby permitting the passage of fuel from the interior of the piston into the passageway 445 and therethrough to the mixing chamber. When the engine is hot, the lower end of the stop 78 prevents the ball valve 508 from seating on the valve seat 512, with the result that the piston 504 will move upwardly until the upper end thereof engages the stop 514. In this position part of the fuel supplied to the interior of the piston 504 will by-pass the valve 508 and be discharged from the upper end of the piston back into the reservoir and part will pass through the aperture 510 into the passageway 445. The stop 514 is provided with slots 516 so as to permit the escape of fuel from the piston 504 into the fuel reservoir.

In Fig. 26 there is illustrated a modified form of pump discharge valve and which comprises a cage 600 secured in a bore at the upper end of the passageway 60 and held therein by a screw 602. The cage is provided with a seat 604 for a ball valve 606 and with a port 608 communicating with the passageway 445. The upper part of the cage is provided with a valve seat 610 upon which a ball valve 612 normally seats and an upper valve seat 614 upon which the valve 612 is adapted to seat when the stop 78 is in the position shown in full lines and when the amount of fuel supplied from the pump through the passage 60 is sufficient to lift the ball valve 612 against the seat 614. When the engine is hot, the thermostat has moved the stop 78 to the position shown in dotted lines, which will prevent the seating of the valve 612 upon the seat 614 so that under such conditions the pump discharge valve will by-pass fuel to the reservoir the same as in connection with the construction shown in Fig. 25. A finger 609 prevents the ball valve 606 from seating against the upper part of its cage.

A modified form of by-pass valve for the pump is illustrated in Fig. 28, and this valve differs from that shown in Fig. 16 in that it is not controlled by the thermostat.

In the construction shown in Fig. 28, a cage 700 is formed to provide valve seats 702 and 704, one of which controls a passage between the interior of the cage and the fuel reservoir, while the other of which controls a passage between the pump cylinder 35 and the interior of the cage. A ball valve 706 is adapted to be seated upon either of the seats 702 or 704, depending upon the direction in which liquid fuel tends to flow through the cage 700. The seat 704 is arranged so that the ball 706 will not seat thereon unless the discharge from the pump cylinder 35 is sufficient to lift the ball 706 against the force of gravity and hence will permit the by-passing of fuel from the pump back to the reservoir when the discharge from the pump is slow. Due to the angle at which the cage 700 is set, it will be observed that the valve 706 will be readily unseated as soon as the pressure in the pump begins to raise. This form of by-pass valve preferably is used in connection with the pump discharge valves shown in Figs. 25 and 26 so that the by-pass valve shown in Fig. 28 will by-pass fuel to the reservoir before the ball valves 508 or 606 are lifted from their seat, unless the velocity of discharge from the pump is sufficiently rapid to seat the ball 706 against seat 704.

The amount of fuel required by any engine under all operating conditions within its range of speed is quite definitely known to-day by their makers, and such requirements, upon being plotted graphically, are known as "fuel mixture curves," "fuel curves," or "mixture ratios," and as such are herein referred to. For further particulars regarding such curves reference may be had to Carburation and Carburettors, by Charles H. Fisher, published by Chapman & Hall, Ltd., 11 Henrietta Street, WC2 London, 1936, and in particular to the fuel mixture curves shown in Fig. 22, page 80; Fig. 24, page 83; Fig. 25, page 87; and others.

As illustrated in Fig. 25, the principal effects upon fuel curve shape variation and control are produced by the air entry characteristics of the bleed passage 460 thereof. The air entry characteristics are made to vary with regard to the amount of air entering the passage through a given size of entry opening, by varying the shape of the entry passage, and such shape is experimentally determined for any given carburetor design, such as herein illustrated. The shape as illustrated in Fig. 25 gives one desired fuel curve shape, and any other desired fuel curve shape can be had by a modification of the fuel entry passage 460 shape and also without movement of the metering pin 454 from the one corresponding setting. The metering pin 454 is not continuously moved by either the throttle or air valve, but, by movement of the pin 454, a richer or leaner fuel curve of same shape can be had, and to a certain extent, a change of fuel curve shape as well, can be produced. For example, a shift from a "part power fuel curve shape" to a "full power fuel curve shape," etc., is actually done by cooperation of the throttle, but only as the throttle is moved through the last few degrees before full open.

With the means illustrated in Fig. 25, only three points of control are at work in providing all the fuel curves needed and all the desired shapes thereof, the result of which is that a greatly simplified metering system has been devised as regards mechanism involved and points of control which must be brought into balance in producing curve shapes and mixture ratios, as compared to both air valve and plain tube types. A carburetor constructed within the scope of the invention disclosed in this application has produced characteristics equal to the best order of performance demanded to-day, in all respects and with ever so much less effort to get desired fuel ratios and curve shapes, as compared to conventional carburetors, and also with approximately only two-thirds of the parts involved in comparative up-to-date carburetors.

This application is a continuation in part of my prior copending application for "Carburetors," Serial No. 92,977, filed July 28, 1936, and now abandoned.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a carburetor, a mixing chamber, a pump for delivering fuel to said mixing chamber, variably opening valve means for automatically varying the amount of fuel delivered to said pump in response to engine operation, said valve means opening and closing in response to operation of said pump as effected by engine operation under conditions which cause variations in pressure or velocity of flow in the induction system of the engine.

2. In a carburetor for an internal combustion engine, a mixing chamber connected to the induction system thereof, a means for delivering fuel to said mixing chamber in response to suction therein, a fuel metering means for controlling the supply of fuel to said fuel delivering means, variable air metering means for supplying and controlling the supply of air to the fuel metering means during engine operation, and means for adjusting said air metering means in accordance with engine temperature whereby the fuel metering means permits the passage of sufficient fuel to the fuel delivering means for starting a cold engine.

3. In a carburetor for an internal combustion engine, a mixing chamber having a throttle therein for controlling the flow of fuel to the induction system of the engine, means for delivering fuel to the mixing chamber in response to suction therein, a fuel metering means for controlling the supply of fuel to said fuel delivering means, and means operable in response to the positioning of the throttle and primarily and directly responsive to the temperature condition of the engine for controlling said fuel metering means so that fuel is supplied to said fuel delivering means in accordance with the requirements of the engine.

4. For an internal combustion engine, a carburetor having a mixing chamber, means for delivering fuel to said mixing chamber in response to suction therein, fuel metering means for controlling the supply of fuel to said fuel delivering means, means for controlling said fuel metering means so as to supply a starting mixture of fuel through said fuel delivering means to said mixing chamber, and means primarily and directly responsive to the temperature condition of the engine for automatically controlling said means for controlling said fuel metering means for changing the mixture of fuel supplied to the mixing chamber from a starting mixture to an operating mixture for a "hot" engine.

5. In a carburetor, a mixing chamber having throttle means for controlling the flow of fuel from said mixing chamber to an engine, means for normally supplying fuel to said mixing chamber, a pump and means connecting said pump with said mixing chamber for the transmission of fuel thereto, means to control the amount of fuel supplied by the pump and comprising means for controlling admission of fuel to said pump, said controlling means being operable by said throttle means to control the admission of fuel to said pump, valve means for regulating the amount of fuel discharged by said pump to said mixing chamber, means responsive to draft changes in said mixing chamber and connected to said pump for operating the same whereby varying proportions of fuel and air are provided, responsive to engine operation under conditions which cause variations in pressure or velocity of flow in the induction system of the engine, and regulated by said throttle means to provide fuel to the engine in excess of the normal fuel supply.

6. In an internal combustion engine, a carburetor connected to the induction system of said engine for supplying fuel thereto, said carburetor comprising means responsive to action produced by a back-fire in said induction system, a fluid pump operable by said back-fire responsive means, said pump being provided with discharge means permitting variable rates of fluid egress therefrom and an inlet means permitting variable rates of fluid ingress thereto whereby under the conditions of engine operation producing a back-fire in the induction system, the said back-fire action responsive means responds to such back-fire action so as to prevent extension of the effects of said back-fire exteriorly of the carburetor.

7. In combination, an internal combustion engine having an induction system, a carburetor therefor and in communication therewith, said carburetor comprising means for supplying a normal fuel supply to the induction system in response to suction therein, means adapted for supplying fuel to the induction system in excess of the normal fuel supply, and means for automatically varying the amount of fuel supplied to said induction system by said second mentioned means in accordance with the load on the engine under all temperature conditions thereof so that the amount of fuel supplied by said second mentioned means to said induction system is increased as the load on the engine increases and decreased as the load on the engine decreases.

8. In combination with an internal combustion engine having an induction system, a carburetor therefor and in communication therewith, said carburetor being provided with means affording an air supply thereto, a throttle means for supplying combustible mixtures of fuel to the induction system in response to the suction therein, other means operable for supplying fuel to the induction system in addition to that supplied in response to suction therein, means for operating said other means in response to engine operation and without materially restricting the air supply to the induction system of the engine, and regulating means operable partly in response to engine temperature, throttle position and pulsations in the induction system, cooperable with said other means for varying the amount of fuel supplied thereby to the induction system during certain conditions of engine operation such for example as during cold and hot operation under part and full loads so that regulated variable amounts of fuel are supplied by said other means to the engine.

9. In combination with an internal combustion engine having an induction system, a carburetor therefor and in communication therewith, a throttle which controls the flow of mixture from the carburetor to said induction system, said carburetor being provided with means affording an air supply thereto, means for supplying combustible mixtures of fuel to the induction system in response to the suction therein, other means operable for supplying fuel to the induction system in addition to that supplied in response to suction therein, means for operating said means in response to engine operation, and regulating means cooperable with said other means for varying the amount of fuel supplied thereby to the induction system so that regulated variable amounts of fuel are supplied by said other means to the engine, said regulating means being operable responsive to positioning of said throttle.

10. In combination with an internal combustion engine having an induction system, a carburetor therefor and in communication therewith, a throttle which controls the flow of mixture from the carburetor to said induction system, said carburetor being provided with means affording an air supply thereto and comprising means for supplying a normal fuel supply to the induction system in response to suction therein, other means operable for supplying fuel to the induction system in excess of the normal fuel supply and regulating means cooperable with said other means for varying the amount of fuel supplied thereby to the induction system so that the amount of fuel supplied by said other means to said induction system is increased as the load on the engine increases and decreased as the load on the engine decreases, said regulating means being operable responsive to positioning of said throttle, engine temperature and to the load on said engine.

11. In a carburetor for an internal combustion engine, a mixing chamber, a throttle which controls the flow of mixture from said mixing chamber to said engine, a draft-actuated valve operable responsive to flow of gas within said mixing chamber, means operable in response to movement of said draft-actuated valve for injecting fuel into the mixing chamber, and means cooperating with said draft valve and throttle to control impulse feeding of fuel by said first mentioned means in response to pulsations in said carburetor resulting from engine operation.

12. In combination, an internal combustion engine having an induction system, a carburetor therefor and in communication therewith, said carburetor comprising a mixing chamber, a throttle which controls the flow of mixture from said mixing chamber, a draft-actuated valve operable responsive to flow of gas within said mixing chamber, means operable in response to movement of said draft-actuated valve for producing an impulse feeding of fuel to said induction system in response to pulsations in said carburetor resulting from engine operation as regulated by said throttle, and means to eliminate the effects of impulse feeding of fuel upon quick closing of the throttle.

13. In a carburetor for an internal combustion engine, a mixing chamber, a throttle operable for controlling the flow of gas from said mixing chamber to the induction system of the engine, a fuel reservoir, means for normally supplying fuel from said reservoir to said mixing chamber in response to suction therein, an air valve movable responsive to the flow of air into said mixing chamber during engine operation, means operable by movement of said air valve for supplying fuel from said reservoir to said mixing chamber in addition to that supplied in response to suction therein, and means operable in response to changes in engine temperature and in part controlled by operation of said throttle for regulating the quantity of fuel delivered by said additional fuel supply means to said mixing chamber.

14. In a carburetor for an internal combustion engine, a mixing chamber provided with means for supplying fuel thereto in response to the flow of air therein, air metering means for regulating the flow of fuel through said fuel supplying means, a draft actuated valve responsive to the flow of gas within said mixing chamber, a throttle for controlling the flow of gas from said mixing chamber to the induction system of said engine, a thermostatic means responsive to engine temperature, and means for controlling said air metering means responsive to operation of said throttle, valve, and thermostatic means to provide the required mixture proportions for optimum engine operation.

15. In a carburetor having a mixing chamber, a fuel pump operable for supplying fuel thereto, means for regulating the amount of fuel supplied by said pump to said mixing chamber, a draft-actuated valve responsive to the flow of gas within said mixing chamber and connected to said pump for operating the same, a throttle for controlling the flow of gas from said mixing chamber to the induction system of an engine, thermostatic means responsive to engine temperature, and means for controlling said regulating means responsive to operation of said throttle and said thermostatic means.

16. For an internal combustion engine, a carburetor having a mixing chamber, an air valve movable responsive to the flow of gas within said mixing chamber, a piece reservoir, a fuel pump adapted to be supplied with fuel from said reservoir and connected to said air valve so as to be operated upon movement thereof to supply fuel to the mixing chamber, said pump having inlet and discharge valve means which permit variable rates of fuel ingress to and egress from said pump, said valve means being constructed to facilitate the ingress of fuel to and the egress of fuel from said pump, said pump being constructed so as to permit said air valve to move in synchronism with pulsations of gas flow within said mixing chamber, and means operable in response to changes in engine temperature for controlling the opening movement of said valve means.

17. In a carburetor having a throttle for controlling the supply of mixture to an internal combustion engine, a mixing chamber, means for normally supplying fuel to said mixing chamber, a pump for supplying additional fuel to said mixing chamber, an inlet valve for said pump, and means for controlling the extent of opening of said inlet valve in accordance with the position of said throttle valve when the engine is hot.

18. In a carburetor for an internal combustion engine, a fuel reservoir and a mixing chamber, with means for normally supplying fuel from said reservoir to said mixing chamber in response to the flow of air therein, a pump operable for supplying additional fuel from said reservoir to said mixing chamber, a by-pass between said pump and said reservoir for returning fuel thereto, and means independent of said pump and responsive to engine temperature for controlling the flow of fuel through said by-pass so as to discontinue by-passing of fuel when the engine is cold, said by-pass being positioned so that it is also operable in part depending upon the position of the piston of said pump.

19. In a carburetor for an internal combustion engine, a mixing chamber with means for continuously supplying fuel thereto in response to the flow of air therein during engine operation, means for regulating the flow of fuel through said supplying means under certain conditions, such, for example, as to provide mixtures for starting and operating a cold engine, said regulating means being automatically adjusted when the engine is cold so that upon cranking of the engine said fuel supplying means will supply a rich mixture for starting such engine, said regulating means being adjustable so as to change the rate of flow from that of a starting mixture to that of a cold operating mixture, means for automatically adjusting said regulating means upon starting of the engine, and means for retarding the adjustment of said regulating means so as to retard the rate at which such change in the fuel flow speed occurs due to adjustment of said regulating means.

20. In a carburetor having a mixing chamber with means for supplying fuel thereto, means for controlling the flow of fuel from said supplying means to said mixing chamber, a throttle operable for controlling the flow of gas within said mixing chamber, an air valve responsive to the flow of gas within said mixing chamber, a thermostat responsive to engine temperature, said air valve, throttle and thermostat operating through a common pivot to operate said controlling means.

21. In a carburetor having a mixing chamber, with means for supplying fuel thereto in response to flow of air therein, means for controlling the flow of fuel through said means, a pump operable for delivering additional fuel to said mixing chamber, means for controlling the amount of fuel discharged by said pump to said mixing chamber, a throttle valve for controlling the flow of gas within said mixing chamber, an air valve responsive to the flow of gas within said mixing chamber and connected to said pump for operating the same, a thermostat responsive to engine temperature, both of said controlling means being operated by the operation of said throttle and thermostat.

22. In a carburetor for an internal combustion engine and in communication with the induction system thereof, means providing a passage for the flow of air within said carburetor responsive to engine operation, said passage being formed at one portion thereof so as to increase the velocity of the flow of air with respect to that in a preceding part of said passage, an air valve arranged at the inlet to said passage and being movable responsive to the flow of air therein, a throttle valve for controlling the flow of fuel from said passage to said induction system, fuel emitting means arranged at said portion of said passage and between said valves, flow of air through said portion producing a vacuum in said emitting means and in said portion which varies with the velocity of the air flow, means for restraining opening movement of said air valve so as to produce an additional vacuum in said emitting means and in said portion of said passage, a source of fuel supply communicating with said emitting means, a fuel metering device arranged between said source and said emitting means and operable to regulate the flow of fuel to said emitting means, an air metering valve which controls said fuel metering device by varying the flow of air through said device, all of the fuel delivered to said passage being delivered through said means at said portion thereof, said air valve having a lost motion connection with said air metering valve for controlling the latter only during part of the range of movement of said air valve.

23. In a carburetor having a mixing chamber connected to the induction system of an engine, an air valve movable responsive to the flow of air within said mixing chamber, means for supplying fuel to said mixing chamber, a metering device for controlling the flow of fuel through said supplying means, said device being controlled at least in part by said air valve and by means responsive to engine temperature so as to produce a lean fuel mixture in the mixing chamber which will cause back-firing of said engine for the purpose of heating up the induction system.

24. A carburetor for an internal combustion engine having a mixing chamber with a throttle therein, an air valve movable responsive to the flow of air within said mixing chamber, means for supplying fuel to said mixing chamber, a metering device for regulating the flow of fuel through said means, said metering device having connections with said throttle and air valve so that it is operated in part by said air valve and in part by said throttle, and means operable upon starting of the engine for discontinuing the operation of said metering device by said air valve.

25. A carburetor for an internal combustion engine comprising a mixing chamber, a fuel reservoir, an air valve movable responsive to the flow of air within said mixing chamber, means for supplying fuel to said mixing chamber from said reservoir, a metering device operatively arranged in said fuel supplying means and between said reservoir and said mixing chamber for regulating the flow of fuel through said means, engine temperature operated means for controlling said metering device to provide a mixture for starting a cold engine upon cranking thereof, said air valve also operating to control said metering device so as to change said starting mixture to an operating mixture independently of said control means, and means for discontinuing the control of said metering device by said air valve after the engine has started.

26. In a carburetor for an internal combustion engine, a mixing chamber, a manually controlled throttle therein, a draft-actuated valve responsive to flow of air within said mixing chamber, a nozzle for supplying fuel to said mixing chamber, means for supplying air to said nozzle, means for supplying fuel to said nozzle, an air metering valve for regulating the flow of fuel through said fuel supplying means, said air metering valve being in part controlled by said draft-actuated valve, and engine temperature responsive means operable for regulating the control of said air metering valve by said draft-actuated valve.

27. A carburetor for supplying fuel to the induction system of an internal combustion engine comprising a mixing chamber, a throttle for regulating the flow of fuel from the mixing chamber to the induction system, a fuel reservoir, means for supplying fuel from the reservoir to the mixing chamber in response to the suction therein, metering means for regulating the flow of fuel through the fuel supplying means comprising an air entry orifice having length and of variable cross-section throughout at least part of its length and adapted for metering air into said fuel supplying means, and a valve member for restricting the flow of air through said orifice and controlled in part by engine temperature.

28. A carburetor for supplying fuel to the induction system of an internal combustion engine comprising a mixing chamber, a throttle for regulating the flow of fuel from the mixing chamber to the induction system, a fuel reservoir, means for supplying fuel from the reservoir to the mixing chamber in response to the suction therein, and metering means for regulating the flow of fuel through the fuel supplying means comprising an air entry orifice which is open at all times during operation of the engine and adapted for bleeding air into the fuel supplying means, and a valve member cooperable with said orifice for regulating the flow of air therethrough.

29. A carburetor for supplying fuel to the induction system of an internal combustion engine comprising a mixing chamber, a throttle for regulating the flow of fuel from the mixing chamber to the induction system, means for supplying fuel to said mixing chamber in response to the suction therein, and means cooperable with said throttle for preventing full opening of the same when the engine is cold.

30. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, metering means for regulating the flow of fuel through said fuel supplying means comprising an air entry orifice adapted for metering air into said fuel supplying means, and liquid fuel metering mechanism operable for varying the flow of liquid fuel from said reservoir into said metering means, and valve means for restricting the flow of air through said orifice and the flow of liquid fuel into said metering mechanism and controlled in part by engine temperature.

31. A carburetor for supplying fuel to the induction system of an internal combustion engine comprising a mixing chamber, a throttle for regulating the flow of fuel from the mixing chamber to the induction system, a fuel reservoir means for supplying fuel from said reservoir to said mixing chamber in response to the suction therein, metering means for regulating the flow of fuel through said fuel supplying means comprising a variable air entry orifice adapted for bleeding air into said fuel supplying means at all times during operation of the engine, and a liquid fuel metering mechanism operable for varying the flow of liquid fuel from said reservoir into metering means in accordance with variations in the size of said orifice.

32. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, and means providing an air entry passageway of fixed shape for bleeding air into said fuel supplying means and which regulates the flow of fuel therethrough in such a manner as to produce a combustible mixture of air and fuel which varies in accordance with a predetermined standard air fuel mixture curve throughout the entire range of engine operation, the shape of said passageway being the controlling factor in determining the fuel air mixture ratio in accordance with said curve.

33. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, means providing an air entry passageway of fixed shape for bleeding air into said fuel supplying means and which regulates the flow of fuel therethrough in such a manner as to produce a combustible mixture of air and fuel which varies in accordance with a predetermined standard air fuel mixture curve throughout the entire range of engine operation, and an air entry passageway of a different fixed shape for bleeding air into said fuel supplying means and which regulates the flow of fuel therethrough in such a manner as to produce a combustible mixture of air and fuel which varies in accordance with a different standard air fuel mixture curve throughout the entire range of engine operation, the shapes of said passageways being the controlling factor in determining the fuel air mixture ratios in accordance with said curves.

34. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, means providing an air entry passageway of fixed shape for bleeding air into said fuel supplying means and which regulates the flow of fuel therethrough in such a manner as to produce a combustible mixture of air and fuel which varies in accordance with a predetermined standard air fuel mixture curve throughout the entire range of engine operation, and means for changing the shape of said passageway so as to produce a combustible mixture of air and fuel which varies in accordance with a different standard air fuel mixture curve throughout the entire range of engine operation, the shapes of said passageways being the controlling factor in determining the fuel air mixture ratios in accordance with said curves.

35. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, means providing an air entry passageway of one fixed shape for bleeding air into said fuel supplying means and which regulates the flow of fuel therethrough in such a manner as to produce a combustible mixture of air and fuel which varies in accordance with a predetermined standard air fuel mixture curve throughout the entire range of engine operation, and an air entry passageway of a different fixed shape for bleeding air into said fuel supplying means and which regulates the flow of fuel therethrough in such a manner as to produce a combustible mixture of air and fuel which varies in accordance with a different standard air fuel mixture curve throughout the entire range of engine operation, the shapes of said passageways being the controlling factor in determining the fuel air mixture ratios in accordance with said curves, and thermostatic means responsive to the temperature condition of the engine for controlling said means so as to render one or the other of said passageways operable.

36. In a carburetor for supplying fuel to the induction system of an internal combustion engine, a mixing chamber, a throttle for regulating the flow of fuel from the mixing chamber to the induction system, a fuel reservoir, means for normally supplying fuel from the reservoir to the mixing chamber in response to the suction therein, means for supplying additional fuel from the reservoir to the mixing chamber, a discharge control valve operatively arranged between said additional fuel supplying means and said mixing chamber, said valve being constructed and arranged so as to by-pass fuel back to the reservoir when the engine is hot, and temperature controlled means operative when the engine is cold for preventing the by-passing of fuel by said discharge control valve when the engine is cold.

37. In a carburetor for an internal combustion engine, a fuel reservoir, a mixing chamber, means for delivering fuel from said reservoir to said mixing chamber in response to the suction therein, air metering means operable during engine operation for variably metering air into said fuel delivering means for regulating the flow of fuel through said fuel delivering means in response to the suction in the mixing chamber, and means for controlling said air metering means in accordance with engine temperature to provide the required mixture proportions for starting a cold engine.

38. In a carburetor for supplying fuel to the induction system of an internal combustion engine, a mixing chamber, a nozzle for supplying fuel to said mixing chamber in response to suction therein, a throttle for controlling the flow of fuel from the mixing chamber to the induction system of an engine, a fuel reservoir communicating with said nozzle, an air metering valve adjustable for controlling the flow of fuel from said reservoir to said nozzle, an air valve movable responsive to the flow of gas within said mixing chamber and which is constructed so as to flutter at low speed engine operation, said air metering valve being controlled at least in part by movement of said throttle and air valve, and a fuel pump communicating with said nozzle and operable in response to operation of said last mentioned valve and adapted to supply fuel to said mixing chamber independently of said air metering valve and in addition to the fuel supplied to the mixing chamber in response to suction therein under the control of said air metering valve so as to provide the required mixture proportions for optimum engine operation under conditions such as when the engine is operating at a relatively low speed.

39. In a carburetor for an internal combustion engine, a fuel reservoir, a mixing chamber, an air valve through which substantially all of the gas flows into said mixing chamber and movable responsive to such flow of air into said mixing chamber, fuel supply means connecting said reservoir and chamber and adapted to supply a mixture of fuel and air to said mixing chamber in response to suction therein, and an air metering device forming a part of said fuel supply means and operable to vary the mixture ratio of air and fuel supplied by said fuel supplying means to said mixing chamber, a thermostat operable responsive to changes in engine temperature, and connections between said thermostat, air valve and device by means of which said device is in part controlled by the position of said air valve and by engine temperature when the engine is cold to provide a rich mixture for starting and operating a cold engine.

40. In a carburetor for an internal combustion engine, a mixing chamber, means for supplying fuel to the mixing chamber in response to suction therein, a pump having a connection from the discharge thereof to said mixing chamber and operable during engine operation for delivering fuel to the mixing chamber in addition to that supplied in response to suction therein, and a metering valve in said connection movable responsive to the flow of fluid delivered by said pump and operable to vary the amount of fuel supplied from said pump to said mixing chamber in accordance with the rate of flow of fuel delivered by the pump so as to restrict the amount of fuel delivered from said pump to said mixing chamber during rapid operation of said pump when said engine is hot, and means operable in response to engine temperature for controlling said valve to permit the delivery of a greater percentage of the fuel delivered by said pump to said mixing chamber during cold operation of said engine.

41. In a carburetor for an internal combustion engine, a mixing chamber, a throttle for controlling the flow of fuel from said mixing chamber to the induction system of the engine, a fuel reservoir, means for supplying fuel from said reservoir to said mixing chamber in response to the suction therein, a pump operable during engine operation and connected with said reservoir and mixing chamber for supplying fuel to said mixing chamber in addition to that supplied in response to suction therein, an inlet valve for said pump for controlling the flow of fuel from said reservoir to said pump, said valve opening and closing in response to operation of said pump and regardless of the position of the throttle, and yieldable means having a connection with said throttle for controlling the extent of opening of said inlet valve, said yieldable means being variable by positioning of the throttle and throughout the entire range of movement of the throttle for controlling the ingress of fuel to said pump and thereby controlling the egress of fuel from said pump to said mixing chamber.

42. In a carburetor for an internal combustion engine, a mixing chamber, a fuel reservoir, a nozzle having a communication with said reservoir and operable for supplying fuel to said chamber in response to suction therein, an air metering valve operable for admitting air to said communication for regulating the flow of fuel to said nozzle and adapted to be closed so as to provide a rich mixture for starting a cold engine, and a draft-affected valve movable responsive to the flow of air into said mixing chamber and having a lost motion connection with said air metering valve for partially opening the same so as to provide an economy mixture for operating a cold engine upon starting thereof, said lost motion connection thereafter permitting movement of said draft-affected valve during engine operation without affecting the position of said air metering valve.

43. In a carburetor having a fuel reservoir, a mixing chamber, a nozzle in said mixing chamber connected by a fuel line with said reservoir for supplying fuel from said reservoir to said mixing chamber in response to the flow of air in said mixing chamber and throughout the entire operating range of the carburetor, a throttle for regulating the flow of gas within said mixing chamber, a metering device for regulating the flow of fuel from said reservoir through said fuel line and said nozzle to said mixing chamber, said metering device being entirely dependent for its operation upon suction produced at said nozzle, and comprising an air metering valve operable for bleeding air into said fuel line between said reservoir and said nozzle, said air metering valve comprising a Venturi-shaped orifice with a metering pin arranged in the throat thereof, said pin being connected to said throttle and movable thereby, said air metering valve being arranged for admitting air to said fuel line at all positions of said throttle.

44. In a carburetor for an internal combustion engine, a mixing chamber, a fuel reservoir, a throttle, a fuel nozzle in communication with said reservoir and communicating with said mixing chamber ahead of said throttle and adapted to supply fuel from said reservoir to said mixing chamber in response to suction therein, a draft-actuated valve at the air inlet to said mixing chamber and movable responsive to the flow of air into said mixing chamber during engine operation, a fuel nozzle communicating with said mixing chamber beyond said throttle for supplying fuel thereto in response to suction in said mixing chamber, a pump operable for delivering additional fuel from said reservoir to said mixing chamber through said first-mentioned fuel nozzle and connected with said draft valve so as to be actuated thereby upon movement thereof, and a valve in the fuel line between said reservoir and said first-mentioned nozzle and operable when closed for shutting off only the supply of fuel to said mixing chamber through said first-mentioned nozzle in response to suction therein, said fuel line valve being controlled by said throttle so that said valve is closed when said throttle is substantially closed.

45. In a carburetor for an internal combustion engine, a fuel reservoir and a mixing chamber, with means for normally supplying fuel from said reservoir to said mixing chamber in response to the flow of air therein, a pump including a piston operable for supplying additional fuel from said reservoir to said mixing chamber, an air valve movable in response to flow of air into said mixing chamber and connected to said piston for operating the same, a by-pass between said pump and said reservoir for returning fuel thereto, means for controlling the flow of fuel through said by-pass, said by-pass and controlling means being constructed so as to by-pass more fuel in proportion to the amount displaced by the pump when such displacement takes place quickly as compared to when such displacement takes place relatively slowly, and other by-pass means operable for by-passing fuel from the pump back to said reservoir only during low speed engine operation, said air valve positioning said piston at engine speeds above said low speed operation so as to cut off said last-mentioned by-pass means.

46. In a carburetor for an internal combustion engine, a fuel reservoir and a mixing chamber with means for supplying fuel from said reservoir to said mixing chamber in response to the flow of air therein, an air valve movable in response to the flow of air into said mixing chamber and which valve flutters under certain conditions at low speed engine operation, a pump operable by said fluttering of said air valve for supplying fuel from said reservoir to said mixing chamber in addition to that supplied in response to suction therein, said pump being operable during said fluttering action of said air valve to pump fuel in excess of the said additional amount required by the engine during operation thereof when said air valve is fluttering, a metering valve adapted to control the supply of fuel from said pump to said mixing chamber during said fluttering of said air valve, said metering valve including a by-pass for returning to said reservoir said excess part of the fuel delivered by said pump during said fluttering action of said air valve, said metering valve being constructed and arranged so as to discharge the remainder of the fuel to said mixing chamber, said by-pass being constructed so as to close when the rate of fuel flow through said metering valve exceeds a predetermined rate.

47. In a carburetor for an internal combustion engine, a mixing chamber having only a single fuel nozzle for supplying fuel thereto, means for supplying fuel through said nozzle to said mixing chamber in response to suction at said nozzle, a valve movable responsive to flow of air within said mixing chamber, and pump means operable by and simultaneous with opening movement of said valve for ejecting fuel through said nozzle into said mixing chamber in addition to that supplied in response to said suction, and means arranged between said pump means and said fuel nozzle to said mixing chamber to prevent discharge of fuel from said pump means under the influence of suction within said fuel nozzle.

48. In a carburetor for supplying fuel to the induction system of an internal combustion engine, a mixing chamber, a throttle for regulating the flow of fuel from the mixing chamber to the induction system, a fuel reservoir, means, including a pump for supplying fuel from said reservoir to said mixing chamber, said pump being constructed and arranged to pump fuel regardless of the speed of operation thereof, a by-pass between said pump and said reservoir for returning to said reservoir part of the fuel discharged by said pump, and a valve constructed and arranged to be actuated by the fuel discharged by the pump and controlling the flow of fuel through said by-pass, said valve being constructed and arranged in such a manner that the discharge of fuel from said pump at or below a predetermined rate will position said valve to open said by-pass and the discharge of fuel from said pump above said predetermined rate will position said valve to close said by-pass.

49. A carburetor according to the construction set forth in claim 34 wherein means are provided for proportioning the rate of flow of fuel through said fuel supplying means relative to the air entering said fuel supplying means through said air entry passageway so as to obtain the fuel air mixture ratio in accordance with said curves.

50. A carburetor for supplying a combustible mixture of fuel and air to the induction system of an internal combustion engine, said carburetor comprising a mixing chamber adapted to be associated with said induction system and subject to fluid pressure conditions between the atmosphere and said induction system, a throttle valve associated with said mixing chamber and said induction system for controlling said fluid pressure conditions within said mixing chamber throughout the entire operating range of said engine, said throttle valve having a starting position for starting said engine when cold, a cold idling position beyond said starting position, and an open position beyond said cold idling position for operating said engine beyond said starting and said cold idling position, and means responsive to the initial firing of said engine and to the movement of said throttle from said starting position to said open position for preventing the return movement of said throttle to said starting position upon the starting of said engine when cold.

51. A carburetor for supplying a combustible mixture of fuel and air to the induction system of an internal combustion engine, said carburetor comprising a mixing chamber adapted to be associated with said induction system and subject to fluid pressure conditions between the atmosphere and said induction system, a throttle valve associated with said mixing chamber and said induction system for controlling said fluid pressure conditions within said mixing chamber throughout the entire operating range of said engine, said throttle valve having a starting position for starting said engine when cold, a cold idling position beyond said starting position, and an open position beyond said cold idling position for operating said engine beyond said starting and said cold idling position, and means responsive to changes in fluid pressure conditions in said mixing chamber and to the movement of said throttle from said starting position to said open position for preventing the return movement of said throttle to said starting position upon the starting of said engine when cold, and means for rendering said last means inoperative.

52. A carburetor for supplying a combustible mixture of fuel and air to the induction system of an internal combustion engine, said carburetor comprising a mixing chamber adapted to communicate with the atmosphere and with said induction system, a fuel reservoir associated with said mixing chamber, a metering device associated with said reservoir for supplying a rich mixture of fuel and air to said mixing chamber in response to the operation of said engine and the flow of fluid in said mixing chamber and said induction system, said device comprising a member having a common passageway therein for delivering said mixture to said mixing chamber and said induction system and a pair of branch passageways communicating with said common passageway and extending in opposite directions therefrom, one of said branch passageways being in open communication with said fuel reservoir for delivering fuel supplied to said reservoir to said common passageway, the other of said branch passageways being open to the atmosphere for delivering atmospheric air to said common passageway, a valve associated with said last mentioned branch passageway for controlling the admission of said air to said branch passageway in response to the operation of said engine and the flow of fluid in said mixing chamber and said induction system, and means for operating said valve for controlling the admission of air to said last mentioned branch passageway for regulating said mixture of fuel and air delivered to said mixing chamber and said induction system.

53. In a carburetor for an internal combustion engine, a main air passage, suction regulating means comprising a throttle valve for controlling the suction in said main passage while said engine is being started, and during engine operation thereafter, and for controlling the flow of fuel to said engine from said main passage during said engine starting and operation, means for delivering fuel to said main passage in response to the suction therein, valve-type fuel metering means operably disposed in said fuel delivering means, said fuel metering means including variable air metering means for supplying and controlling the supply of air to said fuel delivering means during said engine starting and operation and connecting means, operable in response to actuating means, for adjusting said fuel metering means whereby fuel is supplied through said fuel delivering means to said main passage and said engine in quantities suitable for starting said engine when "cold" and for operating said engine thereafter, said actuating means comprising said suction regulating means, and other means, operable independently of said suction regulating means, for adjusting said fuel metering means, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains substantially so adjusted during substantial movements of said suction regulating means.

54. In a carburetor for an internal combustion engine, a main air passage, suction regulating means comprising a throttle valve for controlling the suction in said main passage while said engine is being started, and during engine operation thereafter, and for controlling the flow of fuel to said engine from said main passage during said engine starting and operation, means for delivering fuel to said main passage in response to said suction therein, valve-type fuel metering means operably disposed in said fuel delivering means, connecting means operable in response to actuatnig means, for adjusting said fuel metering means whereby fuel is supplied through said fuel delivering means to said main passage and said engine in accordance with the requirements of said engine, said actuating means comprising said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains so adjusted during substantial movements of said suction regulating means, and means limiting the adjustment of said metering means by said other means.

55. For an internal combustion engine a carburetor having a main air passage, suction regulating means comprising a throttle valve for controlling the suction in said main passage while said engine is being started, and during engine operation thereafter, and for controlling the flow of fuel to said engine from said main passage during said engine starting and operation when said engine is "hot," same said means alone controlling the said suction and said fuel flow during "cold" engine starting and operation, means for delivering fuel to said main passage in response to said suction therein, valve type fuel metering means operably disposed in said fuel delivering means, and connecting means, operable in response to actuating means, for adjusting said fuel metering means whereby fuel is supplied through said fuel delivering means to said main passage and said engine in quantities suitable for starting a "cold" engine and for operating a "hot" engine, said actuating means comprising said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains so adjusted during substantial movements of said suction regulating means.

56. A carburetor for supplying fuel to an internal combustion engine comprising a main air passage, suction regulating means comprising a throttle valve for controlling the suction in said main passage while said engine is being started, and during engine operation thereafter, and for controlling the flow of fuel to said engine from said main passage during engine starting and operation, a fuel reservoir, means for supplying fuel from said reservoir to said main passage in response to said suction therein, valve-type fuel and air metering means operably disposed in said fuel supplying means and including a variable air metering means for supplying and controlling the supply of air into said fuel supplying means during engine starting and operation, variable liquid fuel metering means for controlling the flow of liquid fuel from said reservoir into said fuel supplying means during engine starting and operation, and connecting means, operable in response to actuating means, said actuating means comprising said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains so adjusted during substantial movements of said suction regulating means.

57. A carburetor for supplying fuel to an internal combustion engine comprising a main air passage, suction regulating valve means associated with said main air passage for controlling the suction in said main passage while said engine is being started, and during engine operation thereafter, and for controlling the flow of fuel to said engine from said main passage during said engine starting and operation, a fuel reservoir, means for supplying fuel to said main passage in response to suction therein comprising valve-type fuel and air metering means operably disposed in said fuel supplying means and including variable air metering means for supplying and controlling the supply of air into said fuel supply means at all times during starting and operation of said engine, liquid fuel metering means operable for varying the flow of liquid fuel from said reservoir into said fuel supplying means during engine starting and operation in accordance with variations in the open area of said air metering means, and connecting means, operable in response to actuating means, said actuating means comprising in part said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means whereby said fuel metering means as adjusted by said actuating means remains so adjusted during substantial movement of said suction regulating means.

58. In combination an internal combustion engine, a carburetor associated therewith and adapted to supply a combustible mixture of fuel and air to said engine, said carburetor comprising a main air passage, a throttle operatively associated therewith for controlling the flow of mixture to said engine, means for delivering fuel from said reservoir to said main air passage in response to the suction therein resulting from engine operation, a fuel metering device of the air-bleed type operatively disposed in said delivering means and between said reservoir and air passage for regulating the flow of fuel through said fuel delivering means, variable air metering means forming a part of said fuel metering device and comprising air entry means, valve means associated with said air entry means and operable to open and close said air entry means and to meter the flow of air in varying amounts into said fuel metering device, adjusting means operable for adjusting said valve means to a plurality of positions so that fuel may be metered by said metering device in quantities to suit the temperature condition of said engine whereby when said valve means is adjusted to one position said metering device meters fuel in quantities suitable for starting a "cold" engine upon cranking thereof, and when adjusted to a different position, said metering device meters fuel in quantities suitable for operating a "hot" engine, said valve means when adjusted to said last-mentioned position remaining in said position during substantial movements of said throttle, and means operable when said throttle is positioned to its full open position for changing the position of said valve means from that to which it was adjusted by said adjusting means to another position, at which position it remains during full open throttle operation of said engine whereby fuel is metered by said metering device in quantities suitable for the full power operation of said engine.

59. In combination an internal combustion engine and a carburetor therefor, comprising a main air passage wherein a final mixing of air and fuel occurs enroute to said engine, fuel receiving means, fuel conveying means for conveying fuel from said receiving means into said main air passage in response to the absolute air pressure therein while said engine is being started and during engine operation thereafter, valve-type fuel metering means disposed in said fuel conveying means and including connecting means, operable in response to actuating means, for adjusting said fuel metering means whereby fuel is supplied through said fuel conveying means to said main air passage and said engine, in quantities that vary as influenced by said absolute air pressure in said main air passage and whereby fuel and air mixtures are produced suitable for "cold" starting; "warm-up" economy; "warm-up" full power; "hot" economy; and "hot" full power engine operation, each of said mixtures being produced by predetermined settings of said fuel metering means in accordance with regulation by said actuating means, said metering means as adjusted by said actuating means remaining so adjusted during substantial changes in the rate of air flow through said main air passage enroute to said engine, after said engine has been started and during substantial movements of regulating means, said actuating means comprising in part said regulating means for said absolute air pressure, and other means for adjusting said fuel metering means so that fuel may be metered by said fuel metering means in quantities to suit the temperature condition of said engine, said last two mentioned means acting separately and also in combination in such manner as to permit substantial movement of said regulating means without corresponding adjustment of said fuel metering means and so that said fuel metering means may be adjusted by said other means independently of movement of said regulating means, said regulating means controlling the flow of fuel to said engine and the absolute air pressure in said main air passage while starting said engine when normal "hot," same said regulating means alone controlling said absolute air pressure while normally operating said engine, thereafter, and, also while starting said engine when less than normal "hot" and when substantially less than normal "hot," and when normally operating said engine thereafter, said regulating means occupying the same position relative to its open and closed position during both of said starting operations, said regulating means including a throttle.

60. In combination, an internal combustion engine, a carburetor associated therewith and adapted to supply to said engine a combustible mixture of fuel and air suitable for the starting and operation thereof after starting, said carburetor comprising a main air passage, a spray nozzle in said passage, fuel metering means, including valve means, said fuel metering means being associated with said spray nozzle and adapted to regulate the flow of fuel to said main air passage in response to the suction therein resulting from starting and engine operation thereafter, a device for controlling in part said valve means, a "one way" connection between said device and said valve means, said device being operable to adjust said valve means to one position, at which position a rich mixture is metered to said engine for the starting thereof when said engine is "cold," a throttle valve associated with said main air passage and operable for controlling the flow of mixture to said engine, said throttle valve having a "starting position" where it sets while starting said engine when said engine is cold, a "cold idling" position beyond said starting position, and further open positions, beyond said cold idling position, stop means associated with said throttle and movable therewith and operable for limiting the closing of said throttle to said "cold idling" position, a mechanism operable incidental to movement of said throttle for changing the position of said valve means independently of said device, from said one position to a second position, said mechanism including an engaging means operable to engage said stop means, whereby upon movement of said throttle and said stop means from said "starting position" to a position beyond said "cold idling" after said engine is started said engaging means will move into the path of said stop means and prevent the return of said throttle to said "starting position," said valve means when adjusted to said second position causes said metering means to meter a mixture that is leaner than that metered when said valve means is adjusted to said one position said leaner mixture being suitable for running said engine.

61. A carburetor for supplying fuel to the induction system of an internal combustion engine comprising a mixing chamber, a throttle for regulating the flow of fuel from the mixing chamber to the induction system, a fuel reservoir, means for supplying fuel from said reservoir to said mixing chamber in response to the suction therein, and means providing an air entry passageway of fixed shape having varying cross sectional area at least throughout a part of its length for bleeding air into said fuel supplying means, and which regulates the flow of fuel therethrough in such a manner as to produce a combustible mixture of air and fuel which varies throughout the entire range of engine operation in conformance with a predetermined standard fuel and air mixture curve, said standard curve varying in accordance with predetermined fuel requirements of said engine for a given power output, said shape of said air entry passageway being the controlling factor in determining the final air and fuel mixture ratio in accordance with said curve.

62. In combination an internal combustion engine and a carburetor therefor, comprising a main air passage wherein a final mixing of air and fuel occurs enroute to said engine, fuel receiving means, fuel conveying means for conveying fuel from said receiving means into said main air passage in response to the absolute air pressure therein resulting from engine operation while said engine is being started and from engine operation thereafter, valve-type fuel and air metering means disposed in said conveying means and including connecting means operable in response to actuating means for adjusting said fuel metering means whereby fuel is supplied through said fuel conveying means to said main air passage and said engine, in quantities that vary as influenced by said absolute air pressure in said main air passage at the termination of said conveying means in said main passage, and by all sources in said fuel conveying means and said main passage that cause variations of fuel flow, whereby fuel and air mixtures are produced in proportions suitable for "cold" starting "warm-up" economy, "warm-up" full power, "hot" economy and "hot" full power engine operation, each of said mixtures being produced by predetermined settings of said fuel metering means in accordance with regulation by said actuating means, said metering means as adjusted by said actuating means, remaining so adjusted during substantial changes in the rate of air flow through said main air passage enroute to said engine and during substantial movements of regulating means, after said engine has been started, said actuating means comprising in part said regulating means for said absolute air pressure and other means for adjusting said fuel metering means so that fuel may be metered by said fuel metering means in quantities to suit the temperature condition of said engine, said last two mentioned means acting separately and also in combination, in such manner as to permit substantial movement of said regulating means without corresponding adjustment of said fuel metering means, and so that said fuel metering means may be adjusted by said other means independently of movements of said regulating means, said regulating means controlling the flow of fuel to said engine and the absolute air pressure in said main air passage while starting said engine when normal "hot," same said regulating means alone controlling said absolute air pressure while normally operating said engine, thereafter, and also while starting said engine when less than normal "hot" and when substantially less than normal "hot," and when normally operating said engine thereafter, said regulating means occupying the same position relative to its open and closed position during both of said starting operations, said regulating means including a throttle valve, said air metering means including means providing an air entry passageway of fixed shape for supplying and controlling the supply of air into said fuel conveying means and thereby forming part of the control of the said quantities of fuel supplied to said engine, said passageway having a minimum open area and varying cross sectional area for at least a portion of its length, said lengthwise shape being the controlling factor in said partial control exercised by said air metering means.

63. In a carburetor for an internal combustion engine, a main air passage, suction regulating means comprising a throttle valve for controlling the suction in said main passage while said engine is being started, and during engine operation thereafter, and for controlling the flow of fuel to said engine from said main passage during said engine starting and operation, means for delivering fuel to said main passage in response to said suction therein, valve-type fuel metering means operably disposed in said fuel delivering means, connecting means operable in response to actuating means, for adjusting said fuel metering means whereby fuel is supplied through said fuel delivering means to said main passage and said engine in accordance with the requirements of said engine, said actuating means comprising said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains so adjusted during substantial movements of said suction regulating means, said connecting means acts when said engine is cold to adjust said metering means to a "cold" starting position where a "cold" starting mixture is metered to said engine, said other means acts to adjust said metering means to positions other than said "cold" starting position after said engine has been started, and also acts to overrule the action of said connecting means, said regulating means also acts to adjust said metering means during engine operation to positions other than said "cold" starting position and to overrule the action of said connecting means, whereby in the event of structural failure of said other means, said other means fails to overrule said action by said connecting means, said metering means is positioned to said "cold" starting position, as said connecting means acts, unless said connecting means is overruled by action of said regulating means.

64. A carburetor for supplying a combustible mixture of fuel and air to the induction system of an internal combustion engine, said carburetor comprising a mixing chamber adapted to be associated with said induction system and subject to fluid pressure conditions between the atmosphere and said induction system resulting from engine starting and operation thereafter, a throttle valve associated with said mixing chamber for controlling said fluid pressure conditions in said mixing chamber throughout the entire operating range of said engine, a fuel reservoir associated with said mixing chamber, said fuel reservoir having means associated therewith for maintaining a predetermined fuel level therein, a metering device associated with said fuel reservoir for supplying rich mixtures of fuel and air to said mixing chamber and said induction system in response to said fluid pressure conditions, said metering device comprising a member having a fuel passage formed therein communicating with said reservoir below said fuel level therein and an air passage having an air bleed opening communicating with the atmosphere above said fuel level in said reservoir, said two passages being connected by a common passageway communicating with said mixing chamber and said induction system, an air bleed valve for said air bleed opening for controlling the admission of air through said air passage to said passageway in response to fluid pressure conditions in said mixing chamber and said induction system, said metering device and air bleed valve being operable in response to said fluid pressure conditions for regulating the flow of said mixtures through said passageway to said mixing chamber and said induction system, said air bleed valve being movable for restricting said air bleed opening when starting said engine when cold, said fuel for said engine being supplied through said fuel passage and said common passageway.

65. A carburetor for supplying a combustible mixture of fuel and air to the induction system of an internal combustion engine, said carburetor comprising a mixing chamber adapted to be associated with said induction system and subject to fluid pressure conditions between the atmosphere and said induction system resulting from engine starting and operation thereafter, a throttle valve associated with said mixing chamber and said induction system for controlling the field pressure conditions within said mixing chamber throughout the entire operating range of said engine, a fuel reservoir associated with said mixing chamber, said fuel reservoir having means associated therewith for maintaining a predetermined fuel level therein, a metering device associated with said fuel reservoir for supplying fuel and air to said mixing chamber and said induction system in response to fluid pressure conditions in said mixing chamber and said induction system, said device comprising a member having a passageway communicating with said reservoir below said fuel level therein, said passageway providing a communication between said reservoir below said fuel level therein and said mixing chamber and said induction system, said passageway also being provided with an air entry orifice of venturi shape communicating therewith above said fuel level, and a valve member operable in part by said throttle for varying the flow of air through said orifice, said valve member being disposed in open relation to said air entry orifice throughout the entire range of operation of said engine after the starting of said engine, said valve member being adapted to vary the rate of air admission by said air entry orifice throughout the said last mentioned range of engine operation.

66. A carburetor for supplying a combustible mixture of fuel and air to the induction system of an internal combustion engine, said carburetor comprising a mixing chamber associated with said induction system and subject to fluid pressure conditions between the atmosphere and said induction system resulting from engine starting and operation thereafter having a throttle valve associated therewith for regulating the flow of said mixture from said mixing chamber to said induction system, a fuel reservoir associated with said mixing chamber, means including a pump for supplying fuel from said fuel reservoir to said mixing chamber, said means being actuated in response to variations in fluid pressure in said induction system, said pump being actuated for pumping said fuel upon the actuation of said means by said variations in fluid pressure in said induction system, said pump comprising a by-pass between said pump and said reservoir, a valve in said by-pass for controlling the return of fuel displaced by said pump to said reservoir, said valve having a plurality of positions depending upon the rate of displacement of fuel by said pump, said valve being moved by the displacement of said fuel below a predetermined rate of operation of said pump into a first position permitting the return through said by-pass to said reservoir of some of the fuel displaced by said pump, and in a second position being moved by the displacement of said fuel by said pump at a rate greater than said predetermined rate, for closing said by-pass.

67. In a carburetor for an internal combustion engine, a main air passage, a fuel reservoir, suction regulating means comprising a throttle valve for controlling the suction in said main passage while said engine is being started, and during engine operation thereafter, and for controlling the flow of fuel to said engine from said main passage during said engine starting and operation, means for delivering fuel from said reveroir to said main passage in response to said suction therein, valve-type fuel metering means operably disposed in said fuel delivering means, connecting means operable in response to actuating means, for adjusting said fuel metering means whereby fuel is supplied through said fuel delivering means to said main passage and said engine in accordance with the requirements of said engine, said actuating means comprising said suction regulating means, and other means, operable independently of said suction regulating means, for adjusting said fuel metering means so that fuel may be metered by said fuel metering means in quantities to suit the temperature condition of said engine, said connecting means being connected to said fuel metering means and said suction regulating means and said other means in such a manner as to permit movement of said suction regulating means without corresponding adjustment of said fuel metering means and so that said fuel metering means may be adjusted independently of movement of said suction regulating means, whereby said fuel metering means as adjusted by said actuating means remains so adjusted during substantial movements of said suction regulating means, fuel level controlling means limiting the level of fuel in said reservoir and for also limiting within predetermined limits, variations of said level during said engine starting and operation thereafter, and thereby providing one source of control of the amount of fuel supplied through said delivering means, said metering means comprising a passage through which fuel flows from said reservoir into said delivering means, said passage extending a predetermined distance above the said fuel level in said reservoir, and thereby providing a second source of said control of fuel supplied through said delivering means, said metering means also comprising variable air entry means having an opening variable in area and means for varying the area of said air entry means for supplying and controlling the supply of air into said fuel delivering means, and thereby providing a third source of control of the fuel supplied to said delivering means, variable liquid fuel metering means, having an opening variable in area and means for varying said area for controlling the flow of liquid fuel through said delivering means, and thereby providing a fourth source of control of the fuel supplied to said delivering means, all four of said sources operating in combination providing a definite fuel level in said reservoir, a definite height of said passage above said definite fuel level, a definite open area of said air metering means, and a definite open area of said liquid fuel metering means, whereby an overall degree of control of fuel flow is provided, for supplying fuel in accordance with requirements of said engine, two of said control means being adjustable during said engine starting and operation thereafter to vary the said overall degree of fuel flow control.

JOHN T. RAUEN.

REFERENCES CITED

The following references are of record in the file of this patent:

UNITED STATES PATENTS

| Number | Name | Date |
|---|---|---|
| 817,941 | Stute | Apr. 17, 1906 |
| 1,038,040 | Weiss | Sept. 10, 1912 |
| 1,123,469 | Bennett | Jan. 5, 1915 |
| 1,643,864 | Viel | Sept. 27, 1927 |
| 1,696,929 | Stokes | Jan. 1, 1929 |
| 1,816,070 | Berry | July 28, 1931 |
| 1,821,909 | Girfin | Sept. 1, 1931 |
| 1,821,012 | Guthrie | Sept. 1, 1931 |
| 1,830,562 | Robbins | Nov. 3, 1931 |
| 1,844,738 | Aseltine | Feb. 9, 1932 |
| 1,881,996 | Bicknell | Oct. 11, 1932 |
| 1,967,708 | Ericson | July 24, 1934 |
| 1,982,581 | Hueber et al. | Nov. 27, 1934 |
| 2,024,638 | Grace | Dec. 17, 1935 |
| 2,036,431 | Munch et al. | Apr. 7, 1936 |
| 2,040,254 | Fitzgerald | May 12, 1936 |
| 2,082,393 | Linga | June 1, 1937 |
| 2,088,234 | Djordjevitch | Feb. 15, 1938 |
| 2,124,778 | Hunt | July 26, 1938 |
| 2,138,591 | Bracke | Nov. 29, 1938 |
| 2,144,153 | Henning | Jan. 17, 1939 |
| 2,150,081 | Schorsch | Mar. 7, 1939 |
| 2,158,777 | Renner | May 16, 1939 |
| 2,156,128 | Shaff | Apr. 25, 1939 |
| 2,184,834 | Haast | Dec. 26, 1939 |

FOREIGN PATENTS

| Number | Country | Date |
|---|---|---|
| 397,921 | England | Sept. 4, 1933 |
| 4,381 | England | June 27, 1912 |
| 524,614 | France | May 17, 1921 |
| 593,404 | Germany | Feb. 26, 1924 |